US011932016B2

(12) United States Patent
Inoue

(10) Patent No.: US 11,932,016 B2
(45) Date of Patent: Mar. 19, 2024

(54) LIQUID EJECTING APPARATUS

(71) Applicant: Seiko Epson Corporation, Tokyo (JP)

(72) Inventor: Ryo Inoue, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 161 days.

(21) Appl. No.: 17/462,864

(22) Filed: Aug. 31, 2021

(65) Prior Publication Data

US 2022/0063279 A1 Mar. 3, 2022

(30) Foreign Application Priority Data

Sep. 3, 2020 (JP) ................................ 2020-148318

(51) Int. Cl.
*B41J 2/14* (2006.01)
*B41J 2/165* (2006.01)

(52) U.S. Cl.
CPC ....... *B41J 2/14233* (2013.01); *B41J 2/16511* (2013.01); *B41J 2002/14362* (2013.01); *B41J 2/16526* (2013.01); *B41J 2/16538* (2013.01); *B41J 2202/20* (2013.01)

(58) Field of Classification Search
CPC ................ B41J 2/14233; B41J 2/16511; B41J 2/16526; B41J 2/16538; B41J 2002/14362; B41J 2202/20
See application file for complete search history.

(56) References Cited

U.S. PATENT DOCUMENTS 9,090,069 B2 * 7/2015 Togashi .............. B41J 2/16508
2015/0158301 A1 6/2015 Togashi

FOREIGN PATENT DOCUMENTS

JP 2015-110306 6/2015

* cited by examiner

*Primary Examiner* — Geoffrey S Mruk
(74) *Attorney, Agent, or Firm* — WORKMAN NYDEGGER

(57) ABSTRACT

A liquid ejecting apparatus includes a liquid ejecting head and a cap configured to contact on an annular contacting region provided in a fixing plate. The liquid ejecting head includes head chips, each including a nozzle plate, and the fixing plate provided with opening portions for exposing the respective nozzle plates. A first hole and a second hole different from the opening portions are provided in the fixing plate. The fixing plate includes a first surface provided with the contacting region and a second surface to which the head chips are fixed. The opening portions are disposed inside the contacting region in a plan view when viewed in a direction perpendicular to the first surface. Each of the first hole and the second hole is disposed inside the contacting region in the plan view and is blocked by a filler.

15 Claims, 13 Drawing Sheets

LIQUID EJECTING APPARATUS

The present application is based on, and claims priority from JP Application Serial Number 2020-148318, filed Sep. 3, 2020, the disclosure of which is hereby incorporated by reference herein in its entirety.

BACKGROUND

1. Technical Field

The present disclosure relates to a liquid ejecting apparatus.

2. Related Art

JP-A-2015-110306 discloses a liquid ejecting apparatus including a cap that covers a nozzle row of a head. A cover having six opening portions for exposing the nozzle row is fixed to the head of the liquid ejecting apparatus. Two contacting regions are provided in the cover. An annular rib provided at a tip of the cap contacts in the contacting region, and each of the contacting regions surrounds three of the six opening portions. Further, a positioning hole is provided between the two contacting regions.

In the liquid ejecting apparatus disclosed in JP-A-2015-110306, two caps are provided for one head. In order to reduce the number of components of the liquid ejecting apparatus, the inventors of the present application had examined that the number of caps provided for one head was set to one, and one cap covered all nozzle rows in the one head. Thus, the inventors found a problem that, since the rib provided at the tip of the cap overlaps the positioning hole of the cover, a gap by the positioning hole is formed between the cap and the cover, and thus it is difficult to secure the sealing property. Therefore, the inventors of the present application had examined a change of the arrangement of the positioning hole. However, when the arrangement of the positioning hole is changed to the outside of the contacting region, the size of the head may increase. When the arrangement of the positioning hole is changed to the inside of the contacting region, even though the cap covers the nozzle row, a space in the cap may communicate with the atmosphere through the positioning hole, and thus moisture in an ink in the nozzle may be evaporated and the nozzle may be dried.

SUMMARY

According to an aspect of the present disclosure, a liquid ejecting apparatus is provided. The liquid ejecting apparatus includes a liquid ejecting head and a cap configured to contact on an annular contacting region provided in a fixing plate. The liquid ejecting head includes a plurality of head chips, each including a nozzle plate provided with a plurality of nozzles, and the fixing plate provided with a plurality of opening portions for exposing the respective nozzle plates of the plurality of head chips. A first hole and a second hole different from the plurality of opening portions are provided in the fixing plate. The fixing plate includes a first surface provided with the contacting region and a second surface to which the plurality of head chips are fixed, the second surface being a surface on an opposite side of the first surface. The plurality of opening portions are disposed inside the contacting region in a plan view when viewed in a direction perpendicular to the first surface. Each of the first hole and the second hole is disposed inside the contacting region in the plan view and is blocked by a filler.

DESCRIPTION OF EXEMPLARY EMBODIMENTS

A. First Embodiment

Figure 1:
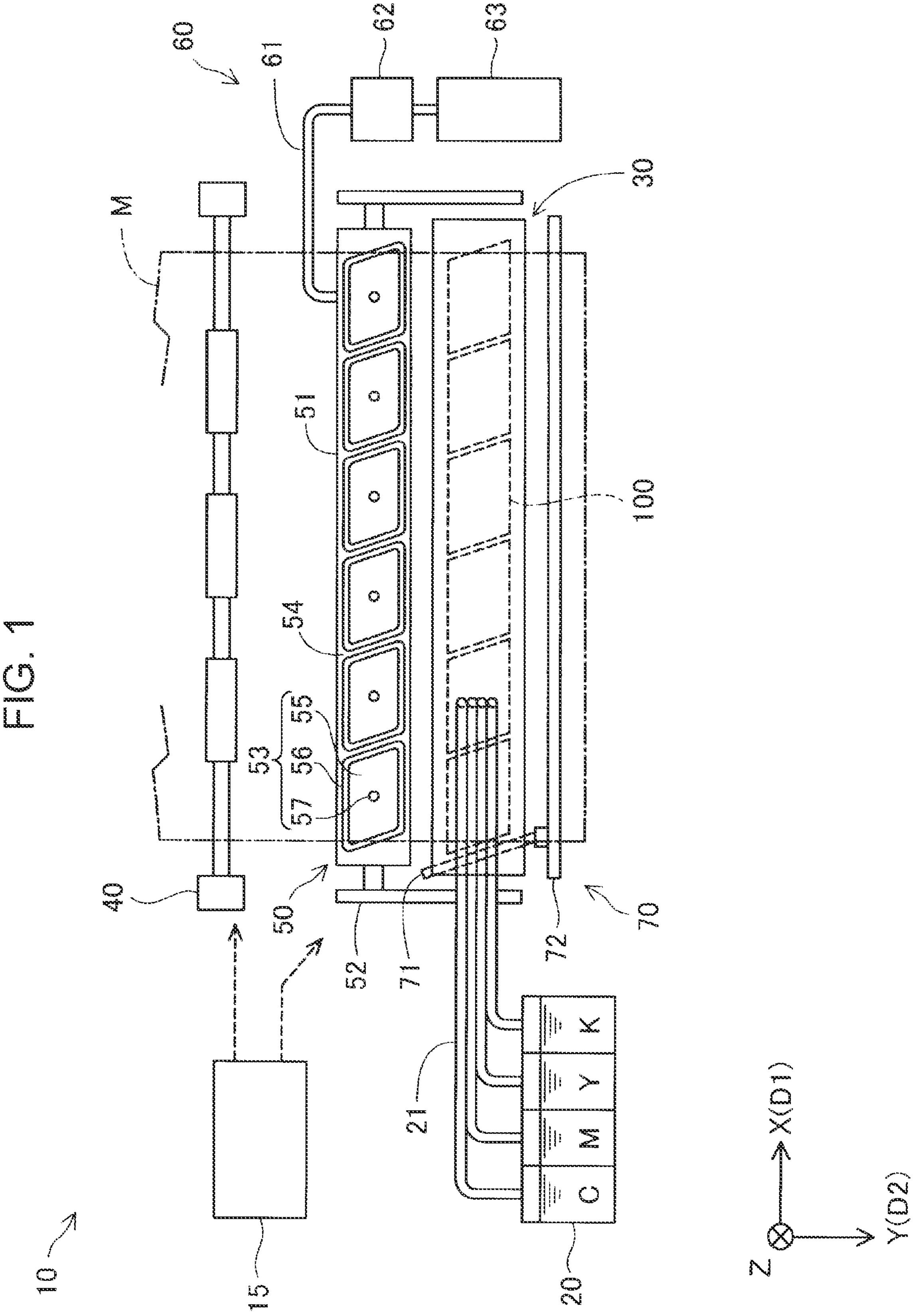
FIG. 1 is a schematic diagram illustrating a configuration of a liquid ejecting apparatus according to a first embodiment.

FIG. 1 is a schematic diagram illustrating a configuration of a liquid ejecting apparatus 10 according to a first embodiment. In FIG. 1, arrows indicating X, Y, and Z directions perpendicular to each other are illustrated. The X and Y directions are parallel to the horizontal plane, and the Z direction is the direction of gravity. The arrows indicating the X, Y, and Z directions are appropriately illustrated in other drawings so that the directions of the arrows correspond to those in FIG. 1. In the following description, when specifying the direction, the positive direction being a direction indicated by the arrow is defined as "+", and the negative direction being a direction opposite to the direction indicated by the arrow is defined as "–". Both positive and negative signs are used in the direction notation. The +X direction may be referred to as a "first direction D1". The +Y direction may be referred to as a "second direction D2".

In the present embodiment, the liquid ejecting apparatus 10 is configured as an ink jet printer that performing printing of an image on a medium M by ejecting an ink as a liquid. The liquid ejecting apparatus 10 includes a controller 15, a liquid container 20, a head unit 30, a transport mechanism 40, a capping mechanism 50, a suction mechanism 60, and a wiping mechanism 70.

The controller 15 is configured by a computer including one or a plurality of processors, a main storage device, and an input/output interface for inputting and outputting a signal to and from the outside of the apparatus. The controller 15 performs various functions by the processor executing a program or a command read on the main storage device. For example, the controller 15 receives image data from a computer coupled by a wired communication or a wireless communication, and converts the received image data into print data indicating on and off of dots to be formed on a medium M. The controller 15 ejects an ink from the head unit 30 while the transport mechanism 40 transports the medium M in the +Y direction, in accordance with the print data, to form dots with the ink at predetermined positions on the medium M. In this manner, the liquid ejecting apparatus 10 performs printing of an image on the medium M.

The liquid container 20 stores the ink to be ejected onto the medium M. In the present embodiment, the liquid container 20 is configured by four containers. The containers individually store four color inks of cyan, magenta, yellow, and black, respectively. Each container of the liquid container 20 is coupled to the head unit 30 via a supply path 21. The supply path 21 is configured by, for example, a flexible tube. The ink stored in the liquid container 20 is supplied to the head unit 30 by, for example, a water head difference. A pressure pump for pressure-feeding the ink toward the head unit 30 may be provided between the liquid container 20 and the head unit 30.

The head unit 30 includes six liquid ejecting heads 100 arranged in the X direction. The head unit 30 distributes the ink of each color, which is supplied from the liquid container 20 via the supply path 21, to each liquid ejecting head 100. The head unit ejects the ink from each liquid ejecting head 100 onto the medium M under a control of the controller 15. The number of liquid ejecting heads 100 provided in the head unit 30 is not limited to six, and may be one, two to five, or seven or more.

The transport mechanism 40 transports the medium M under the control of the controller 15. In the present embodiment, the transport mechanism 40 transports the medium M in the +Y direction. The transport mechanism 40 is, for example, a roller transport type in which the medium M is interposed between rollers from both sides, and then the medium M is transported by a motor rotating the rollers. In addition to the roller transport type, the transport mechanism 40 may be a belt transport type or a drum transport type. In the belt transport type, the medium M is attracted to a belt by using static electricity or air pressure, and then the medium M is transported by the belt. In the drum transport type, the medium M is fed out by rotating a drum around which the medium M is wound.

The capping mechanism 50 includes a cap unit 51 and a cap moving portion 52. In the present embodiment, the cap unit 51 is configured by six caps 53 arranged in the X direction and a support member 54 that supports the six caps 53. Each of the caps 53 has a base 55 and a rib 56 protruding from the base 55 in the −Z direction. The rib 56 is formed in an annular shape when viewed in the +Z direction. A through-hole 57 is provided on an inner side of the rib 56 in the base 55. The cap moving portion 52 relatively moves the cap unit 51 with respect to the head unit 30 under the control of the controller 15. The cap moving portion 52 is configured by, for example, a guide rail and a motor. The cap moving portion 52 relatively moves the cap unit 51 with respect to the head unit 30 in the −Z direction during a period in which the ink is not ejected from each liquid ejecting head 100 onto the medium M. Thus, a tip portion of each rib 56 is caused to contact on the ejecting surface of each liquid ejecting head 100, and at least a portion of the ejecting surface of each liquid ejecting head 100 is covered by the cap 53. The ejecting surface means a surface on which the ink is ejected among the surfaces of the liquid ejecting head 100. In the present embodiment, the ejecting surface is a surface on the +Z direction side among the surfaces of the liquid ejecting head 100. The ejecting surface is configured by a nozzle plate 210 and a fixing plate 150, which will be described later. An operation of covering at least a portion of the ejecting surface of each liquid ejecting head 100 by the cap 53 is referred to as capping. The cap moving portion 52 may not move the cap unit 51 but move the head unit 30 to cover at least a portion of the ejecting surface of each liquid ejecting head 100 by the cap 53.

The suction mechanism 60 includes a discharge path 61, a suction pump 62, and a waste liquid tank 63. The discharge path 61 communicates with each through-hole 57 provided in the cap 53. The discharge path 61 is configured by, for example, a flexible tube. The suction pump 62 is driven under the control of the controller 15. In capping, the suction pump generates negative pressure in a space surrounded by each liquid ejecting head 100 and the cap 53 to suck air bubbles and foreign substances from each liquid ejecting head 100 together with the ink. The suction pump 62 is configured by, for example, a tube pump. The waste liquid tank 63 stores the ink discharged from each liquid ejecting head 100 by the suction pump 62. An operation of, in capping, generating negative pressure in the space surrounded by each liquid ejecting head 100 and the cap 53 to suck air bubbles and foreign substances from each liquid ejecting head 100 together with the ink is referred to as suction cleaning.

The wiping mechanism 70 includes a wiping member 71 and a wiping member moving portion 72. The wiping member 71 is configured by, for example, a rubber blade. The wiping member 71 may be made of cloth or the like. The wiping member moving portion 72 is configured by, for example, a guide rail and a motor. The wiping member moving portion 72 relatively moves the wiping member 71 with respect to the head unit 30 in the +X direction under the control of the controller 15, and thereby the wiping member 71 wipes off the ink, the foreign substances, and the like adhering to the head unit 30. An operation in which the wiping member 71 wipes off the ink, the foreign substances, and the like adhering to the head unit 30 is referred to as wiping. The wiping member moving portion 72 may relatively move the wiping member 71 with respect to the head unit 30 in the −X direction, and thereby the wiping member 71 may wipe off the ink, the foreign substances, and the like adhering to the head unit 30.

Figure 2:
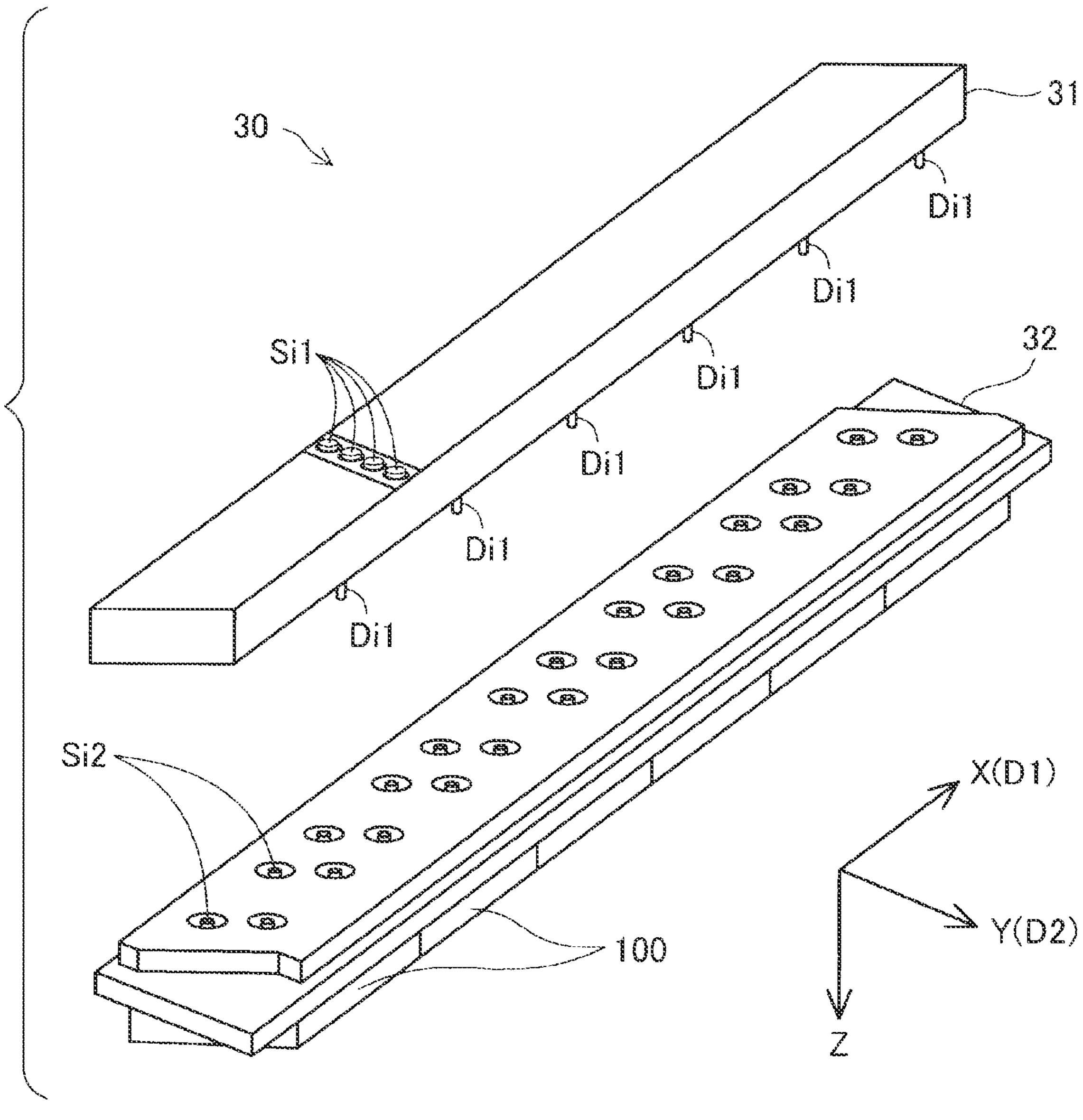
FIG. 2 is a first exploded perspective view schematically illustrating a configuration of a head unit in the first embodiment.
Figure 3:
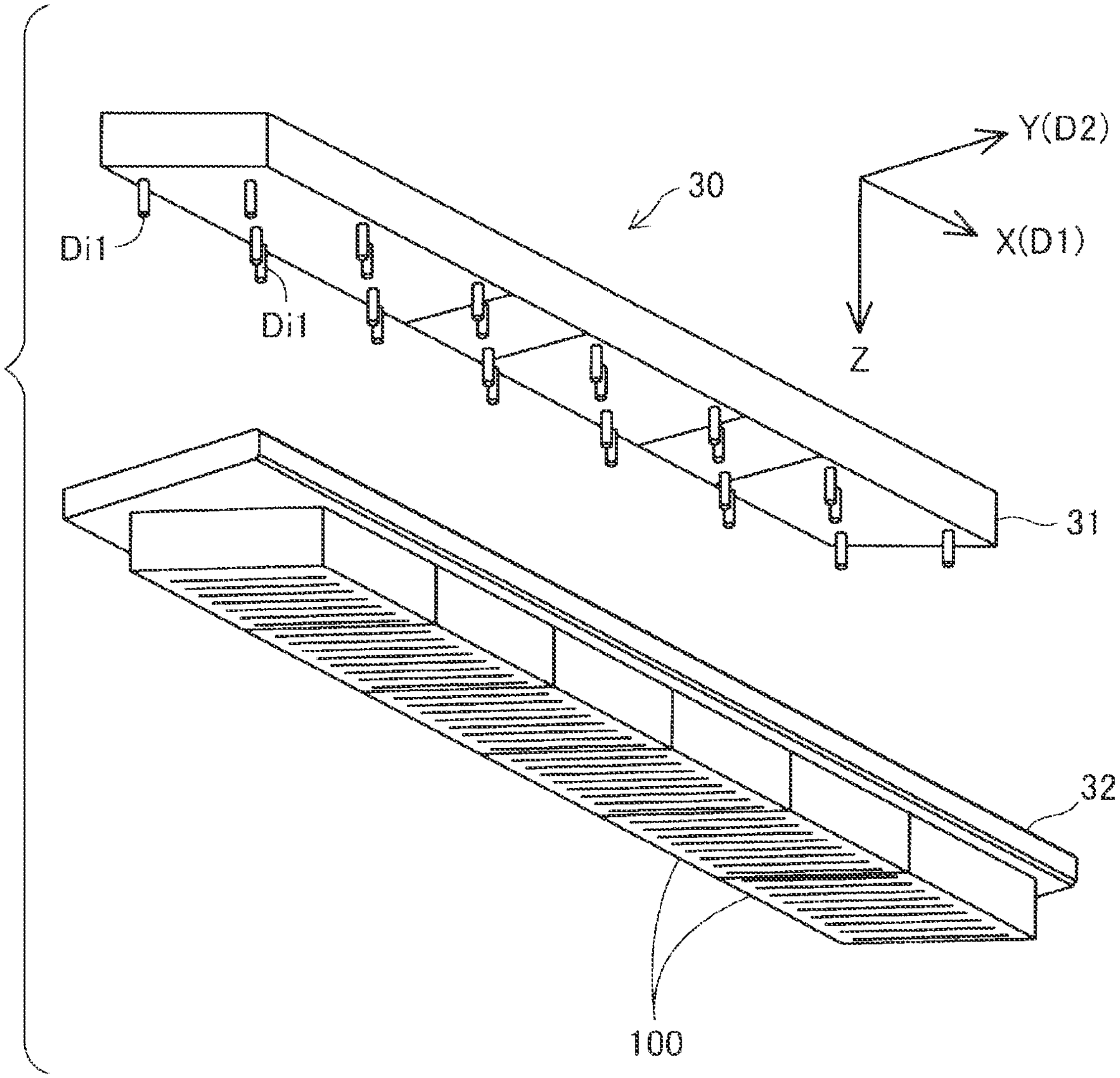
FIG. 3 is a second exploded perspective view schematically illustrating the configuration of the head unit in the first embodiment.
Figure 4:
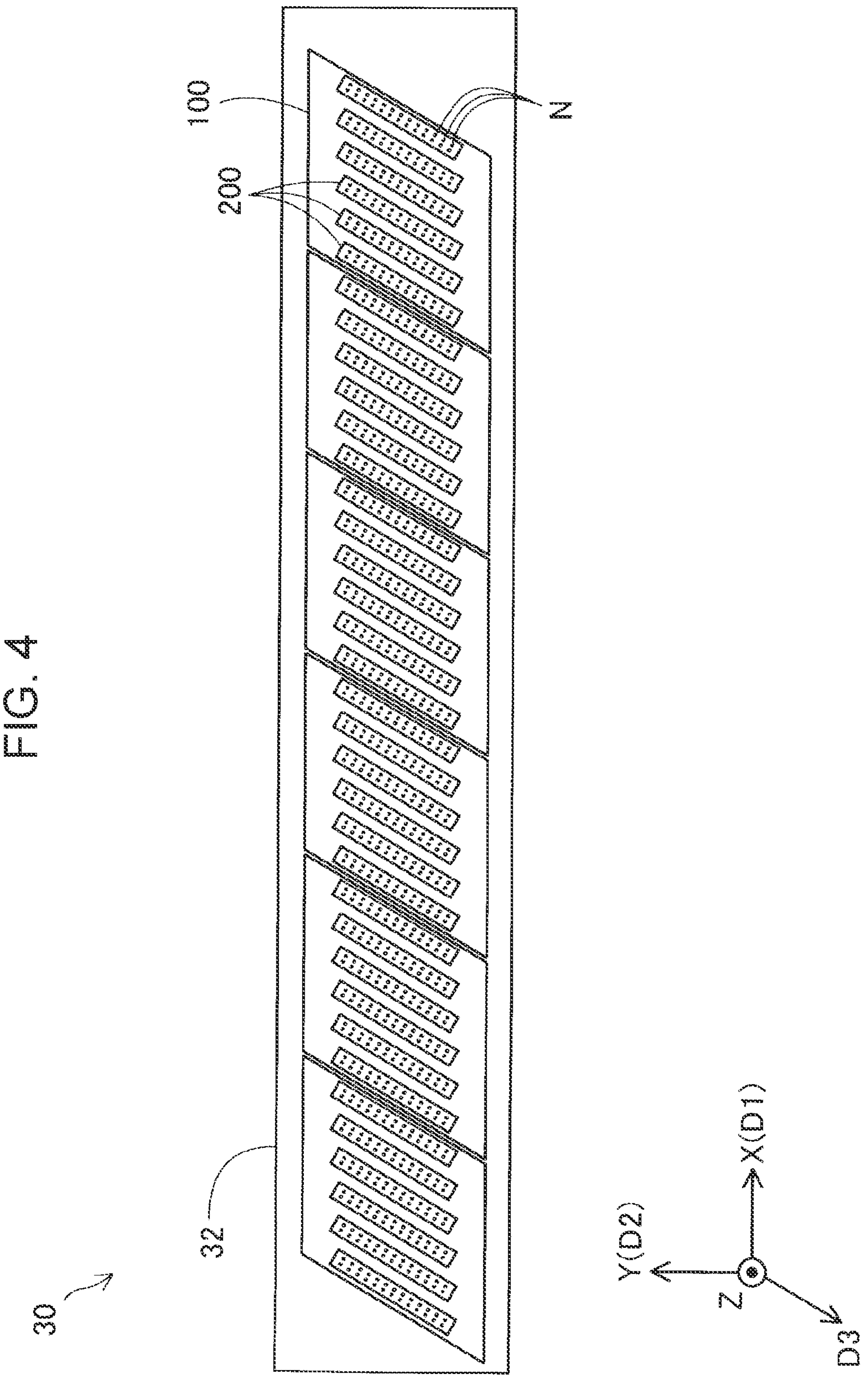
FIG. 4 is a bottom view schematically illustrating the configuration of the head unit in the first embodiment.
Figure 5:
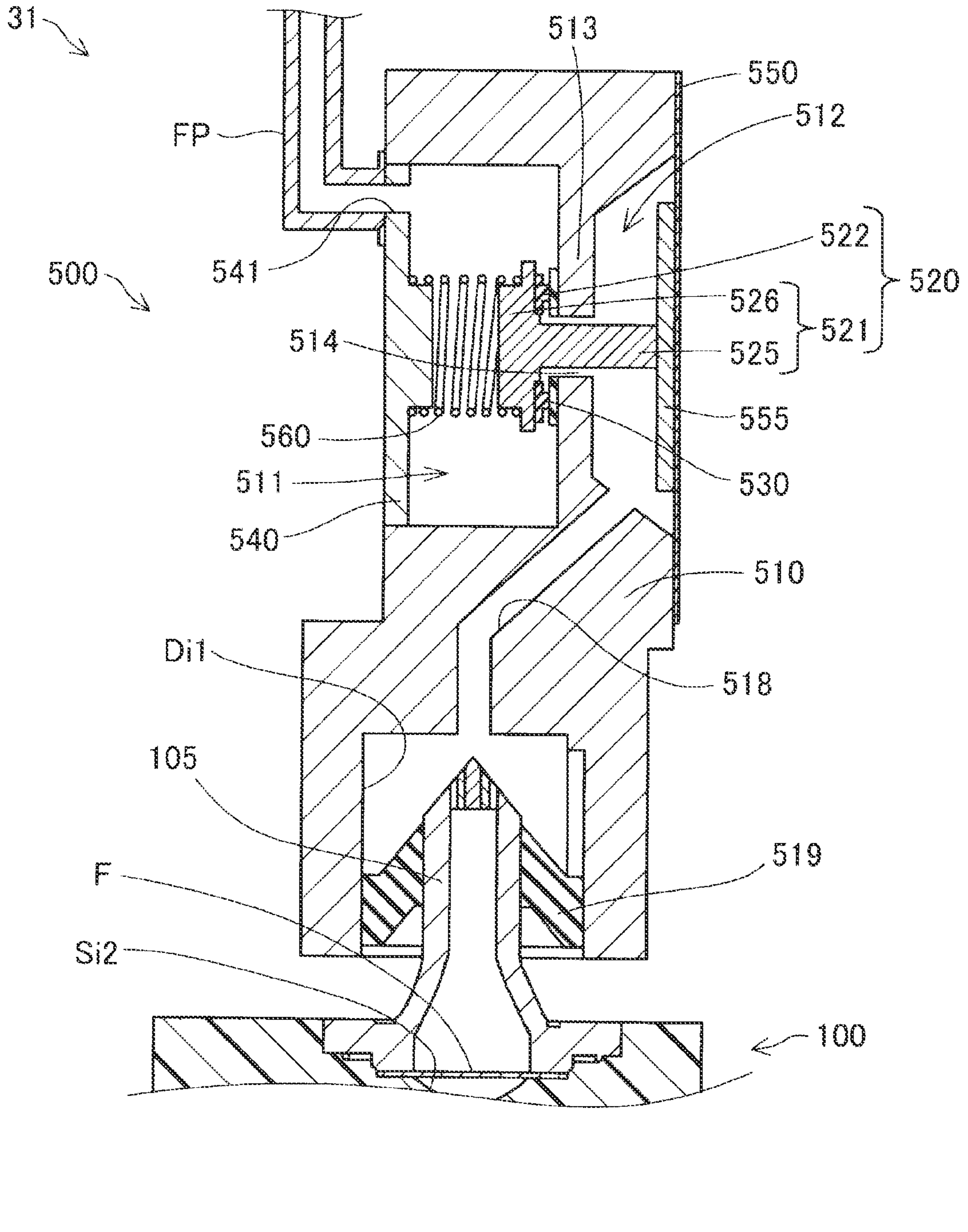
FIG. 5 is a cross-sectional view illustrating a configuration of a first liquid outflow port in the first embodiment.

FIG. 2 is a first exploded perspective view schematically illustrating a configuration of the head unit 30. FIG. 3 is a second exploded perspective view schematically illustrating the configuration of the head unit 30. FIG. 4 is a bottom view schematically illustrating the configuration of the head unit 30. FIG. 5 is a cross-sectional view illustrating a configuration of a first liquid outflow port Di1 of the head unit 30. As illustrated in FIGS. 2 and 3, the head unit 30 includes a distribution flowpath member 31, a support member 32, and six liquid ejecting heads 100.

The distribution flowpath member 31 is provided with first liquid inflow ports Si1 and the first liquid outflow ports Di1. The number of first liquid inflow ports Si1 corresponds to the number of ink colors. The number of first liquid outflow ports Di1 corresponds to the number of ink colors and the number of liquid ejecting heads 100. In the present embodiment, as illustrated in FIG. 2, four first liquid inflow ports Si1 are provided on the surface of the distribution flowpath member 31 on the −Z direction side. The supply path 21 is coupled to each of the first liquid inflow ports Si1. As illustrated in FIG. 3, 24 first liquid outflow ports Di1 are provided on the surface of the distribution flowpath member 31 on the +Z direction side.

Four ink flow paths are provided in the distribution flowpath member 31. One ink flow path is configured by a common flow path communicating with one first liquid inflow port Si1 and six individual flow paths divided from the common flow path. One individual flow path communicates with one first liquid outflow port Di1. The ink introduced into the distribution flowpath member 31 from one first liquid inflow port Si1 is distributed into the six first liquid outflow ports Di1 via the common flow path and the individual flow paths. A pressure adjusting valve 500 illustrated in FIG. 5 is provided between each individual flow path and the first liquid outflow port Di1. The pressure of the ink distributed into each first liquid outflow port Di1 is adjusted by the pressure adjusting valve 500. The configuration of the pressure adjusting valve 500 will be described later.

As illustrated in FIG. 2, the support member 32 is disposed on the +Z direction side of the distribution flowpath member 31, and is fixed to the distribution flowpath member 31 by a screw, an adhesive, or the like. Each liquid ejecting head 100 is disposed on the +Z direction side of the support member 32. Each liquid ejecting head 100 is fixed to the support member 32 by a screw, an adhesive, or the like. Each liquid ejecting head 100 includes four second liquid inflow ports Si2. An opening portion for exposing the second liquid inflow port Si2 is provided in the surface of the support member 32 on the −Z direction side. Each second liquid inflow port Si2 is coupled to each first liquid outflow port Di1. The distribution flowpath member 31 and the support member 32 may be integrated and made of the same member.

As illustrated in FIG. 4, each liquid ejecting head 100 includes a plurality of nozzle rows arranged in the X direction. Each nozzle row is configured by a plurality of nozzles N arranged in a third direction D3 which is perpendicular to the Z direction and intersects both the X direction and the Y direction. Each liquid ejecting head 100 ejects the ink from the nozzles N. The plurality of nozzles N are divided into a group for ejecting a cyan ink, a group for ejecting a magenta ink, a group for ejecting a yellow ink, and a group for ejecting a black ink.

As illustrated in FIG. 5, the pressure adjusting valve 500 includes a housing 510, a valve body 520, a valve seat 530, a lid member 540, a film member 550, and a spring 560. A primary room 511 and a secondary room 512 are provided in the housing 510. The primary room 511 and the secondary room 512 are separated by a partition wall 513. The partition wall 513 is provided with a communication path 514 for causing the primary room 511 and the secondary room 512 to communicate with each other.

The primary room 511 is formed by sealing an opening portion of a recess provided in the housing 510 with the lid member 540. The secondary room 512 is formed by sealing an opening portion of a recess provided in the housing 510 with the flexible film member 550. As the material of the film member 550, for example, high-density polyethylene, polyethylene terephthalate, or the like may be used. A pressure receiving plate 555 is adhered to the surface of the film member 550 on the secondary room 512 side. The rigidity of the pressure receiving plate 555 is higher than the rigidity of the film member 550. A space on an opposite side of the secondary room 512 with the film member 550 interposed between the space and the secondary room communicates with the atmosphere.

The primary room 511 communicates with an individual flow path FP via an inflow path 541 provided in the lid member 540. The individual flow path FP communicates with the first liquid inflow port Si1. The secondary room 512 communicates with the first liquid outflow port Di1 via an outflow path 518 provided in the housing 510. A seal member 519 is provided at the first liquid outflow port Di1. A supply needle 105 for introducing the ink into the liquid ejecting head 100 is provided at a tip portion of the second liquid inflow port Sit of the liquid ejecting head 100. In the supply needle 105, an ink flow path and a filter F for collecting air bubbles and foreign substances contained in the ink are provided. The supply needle 105 penetrates the seal member 519 so that the ink flow path in the supply needle 105 communicates with the outflow path 518.

The valve body 520 is disposed to be movable in the housing 510. The valve body 520 includes a valve main body 521 and an contacting member 522. The valve main body 521 has a columnar shaft portion 525 and a disk-like flange portion 526 coupled to one end of the shaft portion 525. The shaft portion 525 is inserted through the communication path 514. A gap through which the ink flows is formed between the shaft portion 525 and the communication path 514. A tip portion of the shaft portion 525 on the opposite side of the flange portion 526 contacts on the pressure receiving plate 555. The flange portion 526 is disposed in the primary room 511. The contacting member 522 is fixed to the surface of the flange portion 526 on the partition wall 513 side. The contacting member 522 is provided in an annular shape to surround the shaft portion 525. The contacting member 522 is formed of rubber or an elastomer. The valve seat 530 is fixed to the partition wall 513 to face the contacting member 522. The valve seat 530 is provided in an annular shape to surround the communication path 514.

The spring 560 is disposed between the flange portion 526 of the valve body 520 and the lid member 540. One end of the spring 560 contacts on the flange portion 526. The other end of the spring 560 contacts on the lid member 540. The spring 560 urges the valve body 520 toward the secondary room 512. The contacting member 522 of the valve body 520 contacts on the valve seat 530 by the urging force of the spring 560, and thus the communication path 514 is blocked, in other words, the pressure adjusting valve 500 is closed.

When the ink stored in the secondary room 512 flows out from the outflow path 518 and thus the pressure in the secondary room 512 decreases, the film member 550 is bent by the pressure difference between the pressure in the secondary room 512 and the atmospheric pressure. Thus, the pressure receiving plate 555 adhered to the film member 550 moves to the primary room 511 side. When the pressure receiving plate 555 presses the shaft portion 525 against the urging force of the spring 560, the valve body 520 moves, and a gap is formed between the contacting member 522 and the valve seat 530. Thus, the communication path 514 is opened, in other words, the pressure adjusting valve 500 is opened.

When the ink flows from the primary room 511 into the secondary room 512 by the opening of the pressure adjusting valve 500, the pressure difference between the pressure in the secondary room 512 and the atmospheric pressure decreases. Thus, the valve body 520 and the pressure receiving plate 555 are brought back to the original positions by the urging force of the spring 560. The gap between the contacting member 522 and the valve seat 530 is removed, and thus the communication path 514 is blocked, in other words, the pressure adjusting valve 500 is closed. In this manner, the pressure adjusting valve 500 is capable of adjusting the pressure of the ink supplied from the distribution flowpath member 31 to the liquid ejecting head 100. Thus, it is possible to stabilize the supply of the ink from the distribution flowpath member 31 to each liquid ejecting head 100.

Figure 6:
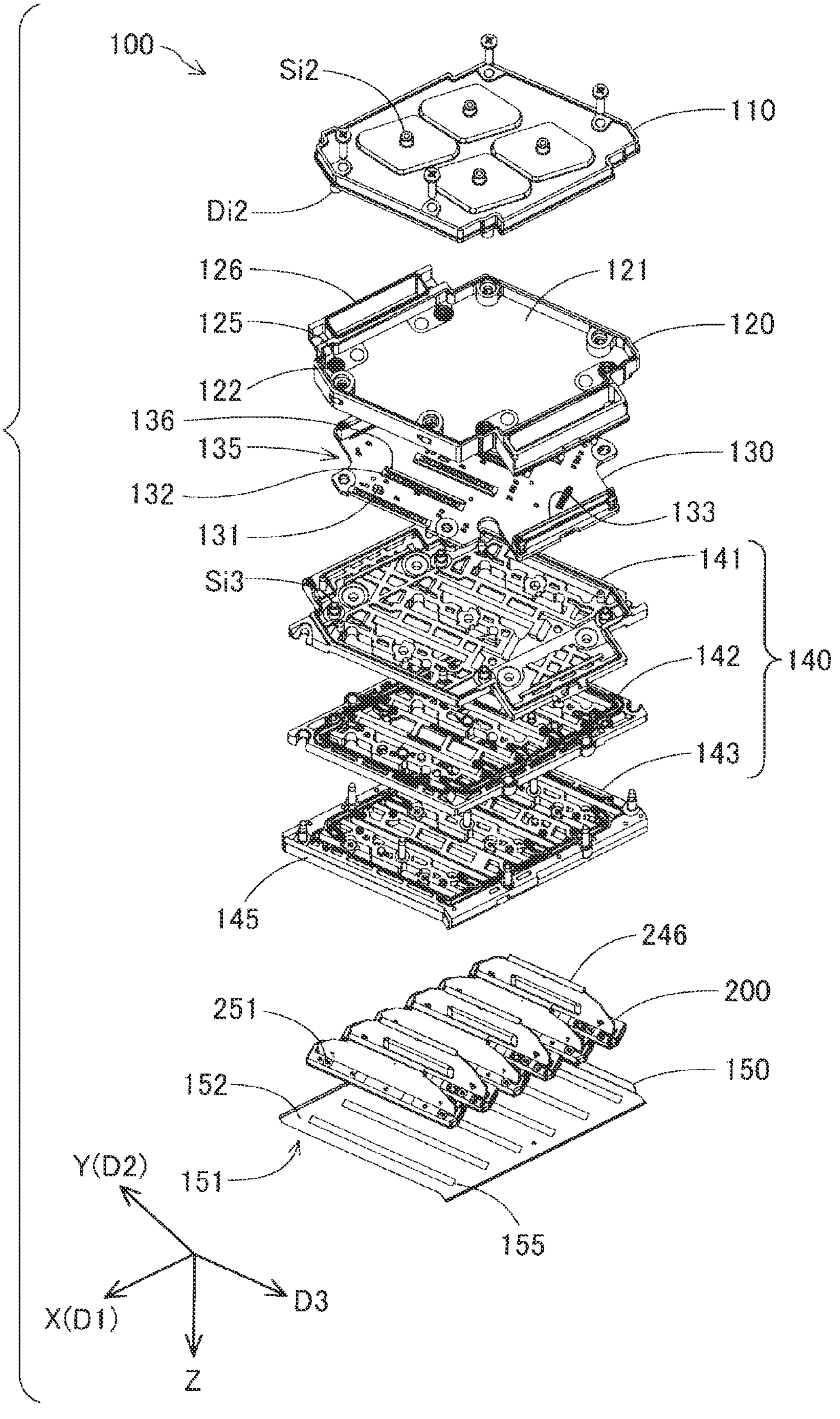
FIG. 6 is an exploded perspective view schematically illustrating a configuration of a liquid ejecting head in the first embodiment.

FIG. 6 is an exploded perspective view schematically illustrating the configuration of the liquid ejecting head 100. The liquid ejecting head 100 includes six head chips 200, a filter unit 110, a cover member 120, a circuit substrate 130, a holder 140, and the fixing plate 150. In the present embodiment, the fixing plate 150, the holder 140, the circuit substrate 130, the cover member 120, and the filter unit 110 are disposed to be stacked in this order from the +Z direction side. The six head chips 200 are accommodated in a space surrounded by the fixing plate 150 and the holder 140. The number of head chips 200 provided in one liquid ejecting head 100 may be two or more, and is not limited to six.

The filter unit 110 is provided with four second liquid inflow ports Si2 and four second liquid outflow ports Di2. Each of the second liquid inflow ports Si2 is formed in a tubular shape and protrudes from the filter unit 110 in the −Z direction. The above-described supply needle 105 is provided at the tip portion of each of the second liquid inflow ports Si2. A flow path communicating with one second liquid inflow port Si2 and one second liquid outflow port Di2 is provided in the filter unit 110. A filter that collects air bubbles and foreign substances contained in the ink is provided in each flow path. In the present embodiment, the filter unit 110 is formed of a resin material such as Zylon (registered trademark) or a liquid crystal polymer.

The cover member 120 is provided with four through-holes 125 coupled to the four second liquid outflow ports Di2 of the filter unit 110 and two cable holes 126 through which a signal cable for coupling the circuit substrate 130 and the controller 15 is inserted. In the present embodiment, the cover member 120 is configured in which a main body portion 121 formed of a resin material such as Zylon (registered trademark) or a liquid crystal polymer that is relatively hard to be deformed and a seal portion 122 formed of an elastomer such as nitrile rubber, silicone rubber, or fluororubber are integrated by two-color molding. The seal portion 122 is provided at the peripheral edge portion of the through-hole 125 and suppresses ink leakage. The cover member 120 is fixed to the filter unit 110 by screws. The main body portion 121 may be formed of a metal material such as stainless steel. In this case, the metal material forming the main body portion 121 and the elastomer forming the seal portion 122 may be integrated by insert molding or outsert molding.

The circuit substrate 130 supplies a drive signal and a power source voltage to each of the head chips 200. Circuit elements 131 such as resistors, capacitors, transistors, and coils are disposed on the circuit substrate 130. A connector 132 and a connector 133 are provided on the surface of the circuit substrate 130 on the −Z direction side. The connector 132 is coupled to a flexible wiring substrate 246 (described later) extending from the head chip 200. The connector 133 is coupled to the signal cable extending from the controller 15. The flexible wiring substrate 246 is coupled to the connector 132 through a slit hole 136 provided in the circuit substrate 130. A notch portion 135 is provided in the circuit substrate 130 so as not to close each through-hole 125 in the cover member 120. In the present embodiment, the circuit substrate 130 is fixed to the cover member 120 and the holder 140 by an adhesive.

The holder 140 is configured by a first holder member 141, a second holder member 142, and a third holder member 143. The third holder member 143, the second holder member 142, and the first holder member 141 are disposed to be stacked in this order from the +Z direction side. Four third liquid inflow ports Si3 are provided on the surface of the first holder member 141 on the −Z direction side. Each of the third liquid inflow ports Si3 is formed in a tubular shape and protrudes from the first holder member 141 in the −Z direction. The third liquid inflow ports Si3 are coupled to the through-holes 125 in the cover member 120, respectively. A flow path for distributing the ink introduced from each of the third liquid inflow ports Si3 into the six head chips 200 is provided in each of the holder members 141 to 143. In the present embodiment, the holder members 141 to 143 are formed of a resin material such as Zylon (registered trademark) or a liquid crystal polymer. The holder members 141 to 143 are fixed to each other by an adhesive. The first holder member 141 is fixed to the main body portion 121 of the cover member 120 and the circuit substrate 130 by an adhesive.

The fixing plate 150 has a first surface 151 being a surface on the +Z direction side and a second surface 152 being a surface on the −Z direction side. The first surface 151 is a surface parallel to the X direction and the Y direction, and constitutes the bottom surface of the liquid ejecting head 100. The fixing plate 150 includes opening portions 155 of which the number corresponds to the number of head chips 200. In the present embodiment, the fixing plate 150 includes six opening portions 155 arranged in the X direction. Each of the opening portions 155 is provided to penetrate the fixing plate 150. The fixing plate 150 is made of a metal material such as stainless steel. The plate thickness of the fixing plate 150 is 80 micrometers. The second surface 152 of the fixing plate 150 and the outer wall portion 145 of the third holder member 143 are fixed to each other by an adhesive. A more specific configuration of the fixing plate 150 will be described later.

The head chips 200 are disposed inside the outer wall portion 145 of the third holder member 143. The head chips 200 are arranged in the X direction on the opening portions 155 of the fixing plate 150, respectively. The head chips 200 are fixed to the second surface 152 of the fixing plate 150 by an adhesive. Four liquid introduction ports 251 for introducing the ink are provided in each of the head chips 200. The ink distributed by the holder members 141 to 143 is supplied to the liquid introduction ports 251.

Figure 7:
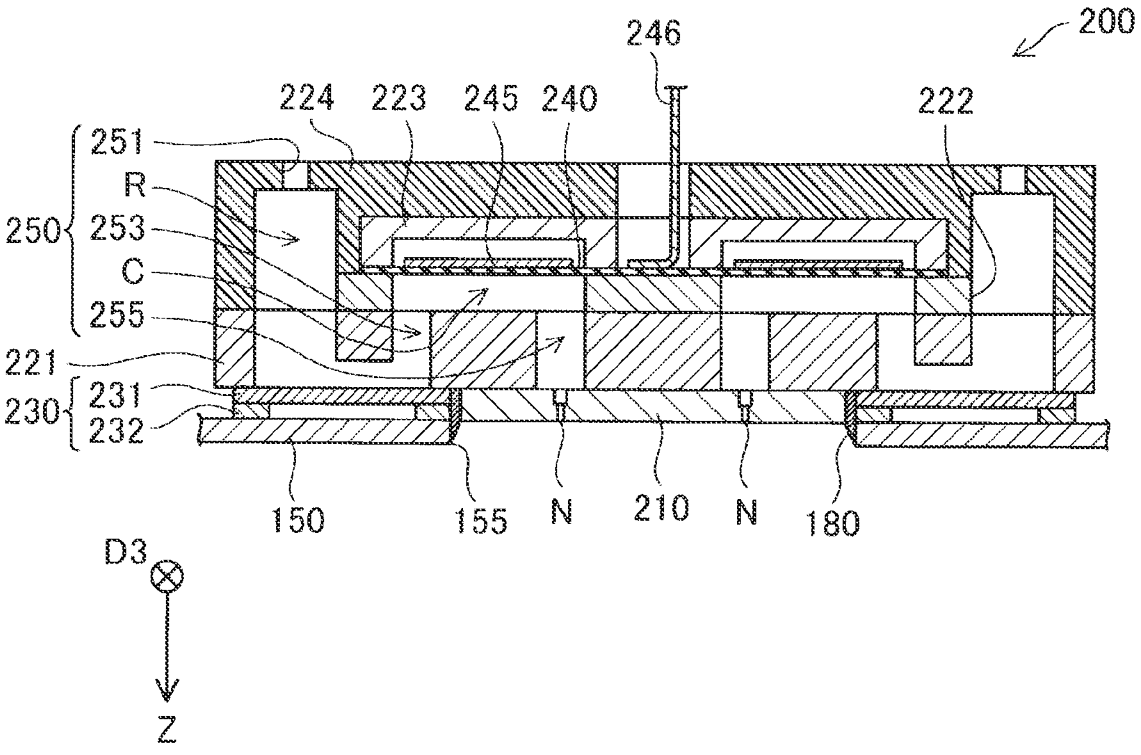
FIG. 7 is a cross-sectional view schematically illustrating a configuration of a head chip in the first embodiment.

FIG. 7 is a cross-sectional view schematically illustrating the configuration of the head chip 200. FIG. 7 illustrates a cross section of one head chip 200 and the fixing plate 150. The head chip 200 includes the nozzle plate 210, a flowpath forming substrate 221, a pressure chamber substrate 222, a protective substrate 223, a compliance portion 230, a vibrating plate 240, a piezoelectric element 245, a flexible wiring substrate 246, and a case 224. In the nozzle plate 210, a plurality of nozzles N for ejecting the ink are provided.

The head chip 200 includes the liquid introduction port 251 for introducing the ink, a reservoir room R, an individual flow path 253, a pressure chamber C, and a communication flow path 255, as an ink flow path 250 that communicates with the nozzles N. The ink flow path 250 is configured by stacking the flowpath forming substrate 221, the pressure chamber substrate 222, and the case 224. The communication flow path 255, the individual flow path 253, and the lower portion of the reservoir room R are provided on the flowpath forming substrate 221. The pressure chamber C is provided on the pressure chamber substrate 222. The liquid introduction port 251 and the upper portion of the reservoir room R are provided in the case 224.

The ink introduced into the case 224 from the liquid introduction port 251 is stored in the reservoir room R. The reservoir room R is a common flow path that communicates with a plurality of individual flow paths 253 respectively corresponding to the plurality of nozzles N constituting the nozzle row. The ink stored in the reservoir room R is supplied to the pressure chamber C through the individual flow path 253. The ink pressurized in the pressure chamber C is ejected from the nozzle N in the +Z direction through the communication flow path 255. The individual flow path 253, the pressure chamber C, and the communication flow path 255 are provided for each nozzle N in the head chip 200.

The nozzle plate 210, the flowpath forming substrate 221, and the pressure chamber substrate 222 are formed of single crystal silicon. The case 224 is formed of a resin material such as Zylon (registered trademark) or a liquid crystal polymer, for example. The nozzle plate 210, the flowpath forming substrate 221, the pressure chamber substrate 222, and the case 224 are fixed to each other by an adhesive.

The nozzle plate 210 and the compliance portion 230 are fixed to the bottom surface of the flowpath forming substrate 221. The nozzle plate 210 is fixed to the lower side of the communication flow path 255. The compliance portion 230 is fixed to the lower side of the reservoir room R and the individual flow path 253. The compliance portion 230 is configured by a sealing film 231 and a support 232. The sealing film 231 is a flexible film-like member. The lower side of the reservoir room R and the individual flow path 253 is sealed by the sealing film 231. The outer peripheral edge of the sealing film 231 is supported by the frame-shaped support 232. The bottom surface of the support 232 is fixed to the fixing plate 150. The compliance portion 230 suppresses pressure fluctuation of the ink in the reservoir room R and the individual flow path 253.

The upper side of the pressure chamber C is sealed by the vibrating plate 240. In the present embodiment, the vibrating plate 240 is configured by stacking an elastic film-like member of silicon oxide or the like and an insulating film-like member of zirconium oxide or the like. The elastic film-like member of silicon oxide or the like in the vibrating plate 240 described above and the pressure chamber substrate 222 may be integrated and formed with the same member.

The piezoelectric element 245 as a driving device is provided on the upper surface of the vibrating plate 240. The piezoelectric element 245 is configured by a piezoelectric body and electrodes formed on both sides of the piezoelectric body. Each of the electrodes of the piezoelectric element 245 is electrically coupled to the flexible wiring substrate 246 provided in the case 224. The flexible wiring substrate 246 is electrically coupled to the circuit substrate 130. The piezoelectric element 245 receives a drive signal supplied from the controller 15 through the flexible wiring substrate 246 to vibrate together with the vibrating plate 240 and change the volume of the pressure chamber C. By reducing the volume of the pressure chamber C, the ink in the pressure chamber C is pressurized, and the ink is ejected from the nozzle N. A heating body may be used as the driving device instead of the piezoelectric element 245.

As illustrated in FIG. 7, an adhesive 180 for filling the gap between the edge of the opening portion 155 in the fixing plate 150 and the edge of the compliance portion 230, and the edge of the nozzle plate 210. As the adhesive 180, an epoxy-based adhesive, a silicone-based adhesive, or the like can be used. Since the adhesive 180 is provided, it is possible to suppress an occurrence of a situation in which the ink enters into the gap. In addition, it is possible to improve the wiping property by the wiping operation by coupling the surface of the nozzle plate 210 on the +Z direction side to the first surface 151 of the fixing plate 150 without a step difference between the surface of the nozzle plate 210 on the +Z direction side to the first surface 151 of the fixing plate 150.

Figure 8:
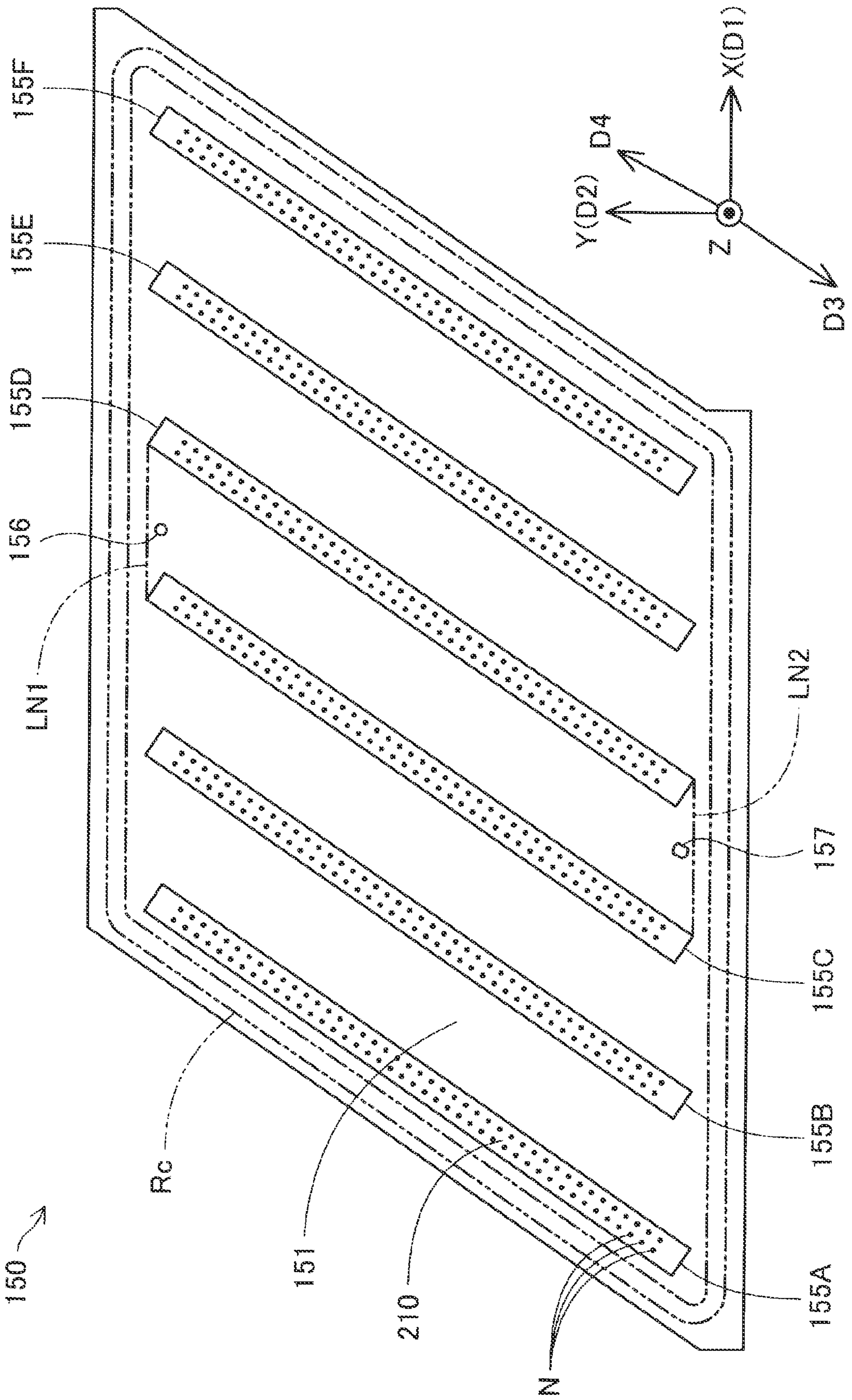
FIG. 8 is a first bottom view illustrating a configuration of a fixing plate in the first embodiment.
Figure 9:
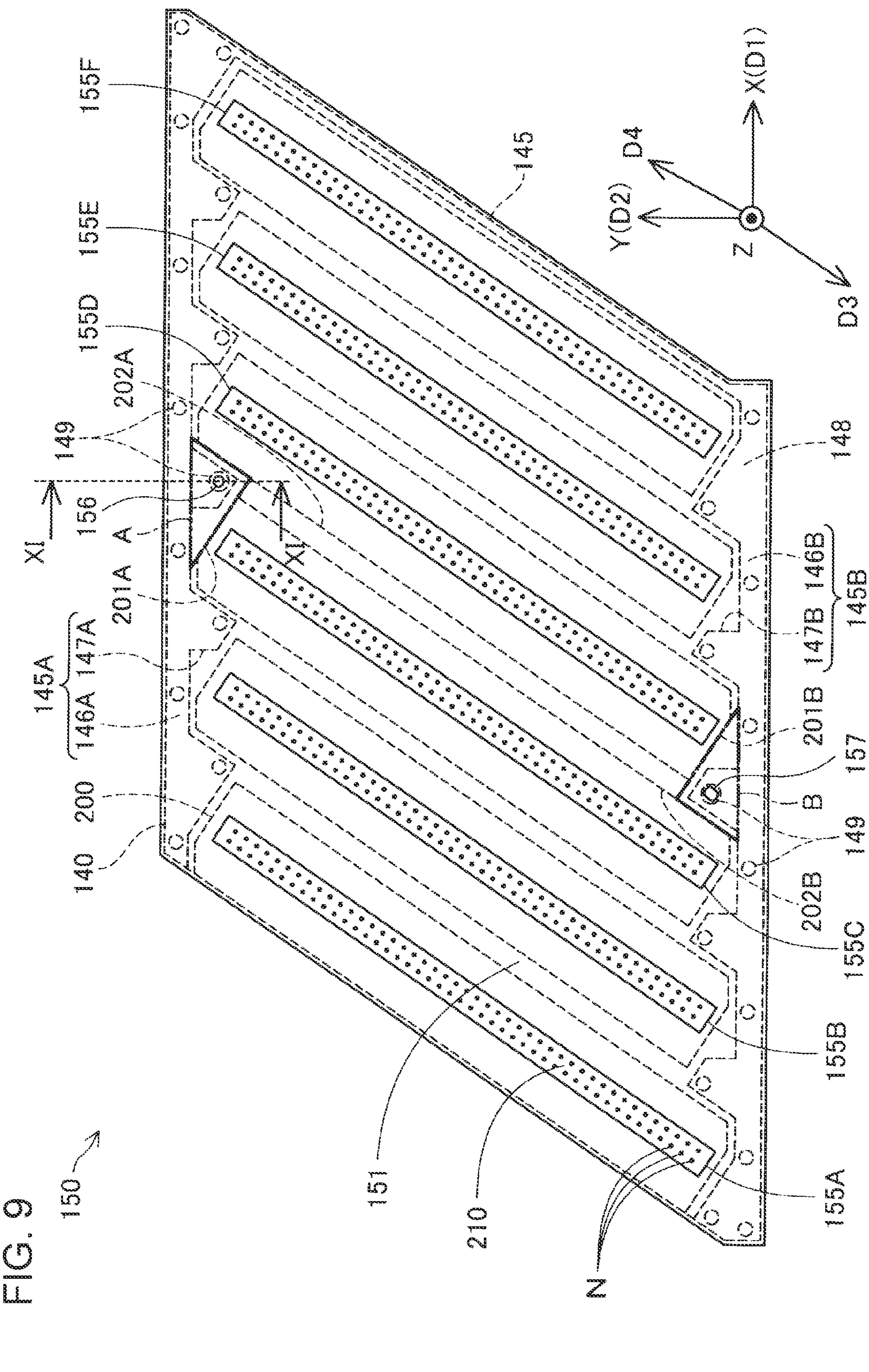
FIG. 9 is a second bottom view illustrating the configuration of the fixing plate in the first embodiment.

FIG. 8 is a first bottom view illustrating the configuration of the fixing plate 150. FIG. 9 is a second bottom view illustrating the configuration of the fixing plate 150. FIG. 8 illustrates the first surface 151 of the fixing plate 150. In FIG. 9, the first surface 151 of the fixing plate 150 is indicated by a solid line, and the six head chips 200 and the outer wall portion 145 of the third holder member 143 are indicated by broken lines.

As illustrated in FIG. 9, each of the head chips 200 has a long outer shape in the third direction D3. More specifically, each of the head chips 200 has a substantially rectangular outer shape having a longitudinal direction along the third direction D3 in a plan view when viewed in a direction perpendicular to the first surface 151.

As illustrated in FIG. 8, the fixing plate 150 includes the six opening portions 155 arranged in the X direction. Each of the opening portions 155 exposes the nozzle row provided in the nozzle plate 210 of each of the head chips 200. In the present embodiment, the opening shape of each of the opening portions 155 is a rectangle having a longitudinal direction along the third direction D3. In the following description, the letters "A" to "F" may be added to the end of the reference signs in order to distinguish the six opening portions 155 from each other. When the six opening portions 155 are distinguished from each other, the opening portions 155 are referred to as an opening portion 155A, an opening portion 155B, an opening portion 155C, an opening portion 155D, an opening portion 155E, and an opening portion 155F in order from the −X direction side.

The fixing plate 150 includes a first hole 156 and a second hole 157 different from the opening portions 155. The first surface 151 of the fixing plate 150 has an contacting region Rc on which the tip portion of the annular rib 56 provided on the cap 53 contacts. The opening portions 155, the first hole 156, and the second hole 157 are disposed inside the contacting region Rc in a plan view when viewed in a direction perpendicular to the first surface 151.

In the present embodiment, the first hole 156 and the second hole 157 are disposed between the two opening portions 155 adjacent to each other among the six opening portions 155. More specifically, the first hole 156 and the second hole 157 are disposed between the opening portion 155C and the opening portion 155D. The opening portion 155 closest to the first hole 156 among the opening portions 155 disposed on the −X direction side of the first hole 156 may be referred to as a "first opening portion". The opening portion 155 closest to the first hole 156 among the opening portions 155 disposed on the +X direction side of the first hole 156 may be referred to as a "second opening portion".

In the present embodiment, the first hole 156 and the second hole 157 are disposed between a first virtual line LN1 and a second virtual line LN2. The first virtual line LN1 connects the end portion of the opening portion 155C on the +Y direction side with the end portion of the opening portion 155D on the +Y direction side. The second virtual line LN2 connects the end portion of the opening portion 155C on the −Y direction side with the end portion of the opening portion 155D on the −Y direction side. The end portion of the opening portion 155C on the +Y direction side refers to a portion of the opening portion 155C located farthest on the +Y direction side. The end portion of the opening portion 155D on the +Y direction side refers to a portion of the opening portion 155D located farthest on the +Y direction side. The end portion of the opening portion 155C on the −Y direction side refers to a portion of the opening portion 155C located farthest on the −Y direction side. The end portion of the opening portion 155D on the −Y direction side refers to a portion of the opening portion 155D located farthest on the −Y direction side.

In the present embodiment, the first hole 156 and the second hole 157 are disposed between the contacting region Rc and a range in which each of the nozzles N is provided, in a direction perpendicular to a wiping direction being a movement direction of the wiping member 71. As described above, in the present embodiment, the wiping direction is the +X direction. The first hole 156 is disposed inside the contacting region Rc and on the +Y direction side of the nozzle N disposed farthest on the +Y direction side among the plurality of nozzles N. The second hole 157 is disposed inside the contacting region Rc and on the −Y direction side of the nozzle N disposed farthest on the −Y direction side among the plurality of nozzles N.

As illustrated in FIG. 9, in the present embodiment, the outer wall portion 145 of the holder 140 includes the first outer wall portion 145A and the second outer wall portion 145B disposed to sandwich the six head chips 200 in the Y direction. The first outer wall portion 145A is disposed on the +Y direction side of the six head chips 200. The second outer wall portion 145B is disposed on the −Y direction side of the six head chips 200. The first outer wall portion 145A includes a first straight line portion 146A provided in the X direction and a plurality of first convex portions 147A protruding from the first straight line portion 146A in the −Y direction. The second outer wall portion 145B includes a second straight line portion 146B provided in the X direction and a plurality of second convex portions 147B protruding from the second straight line portion 146B in the +Y direction.

In the following description, the head chip 200 disposed on the −X direction side among the two adjacent head chips 200 is referred to as a "first head chip". The head chip 200 disposed on the +X direction side among the two adjacent head chips 200 is referred to as a "second head chip". The first convex portion 147A is provided in a region A surrounded by the first straight line portion 146A, a short side 201A close to the first straight line portion 146A among two short sides of the first head chip, and a long side 202A close to the first head chip among two long sides of the second head chip, in a plan view when viewed in the direction perpendicular to the first surface 151 of the fixing plate 150. The second convex portion 147B is provided in a region B surrounded by the second straight line portion 146B, a short side 201B close to the second straight line portion 146B among two short sides of the second head chip, and a long side 202B close to the second head chip among two long sides of the first head chip, in a plan view when viewed in the direction perpendicular to the first surface 151. In a plan view when viewed in the direction perpendicular to the first surface 151 of the fixing plate 150, the short side of the head chip 200 means a side perpendicular to the long side of the head chip 200. In the present embodiment, the long side of the head chip 200 extends in the third direction D3. Thus, the short side of the head chip 200 means a side extending in the direction perpendicular to the third direction D3.

In the present embodiment, the tip portion of the outer wall portion 145 of the holder 140, which faces the second surface 152 of the fixing plate 150 has a bottom surface 148 and a plurality of protrusions 149. The bottom surface 148 is disposed at a distance from the second surface 152. The plurality of protrusions 149 protrude from the bottom surface 148 toward the fixing plate 150 and contact on the second surface 152. Each of the protrusions 149 is provided on the first straight line portion 146A, the first convex portion 147A, the second straight line portion 146B, and the second convex portion 147B. Each of the protrusions 149 has a columnar shape centered on a central axis along the Z direction. The protrusion 149 of the holder 140 is fixed to the second surface 152 of the fixing plate 150 by an adhesive. The sentence that "the plurality of protrusions 149 contact on the second surface 152" includes a case where the protrusion 149 indirectly contacts on the second surface 152 in a manner that the adhesive is sandwiched between the protrusion 149 and the second surface 152. That is, the sentence that "the plurality of protrusions 149 contact on the second surface 152" may mean that the protrusion 149 does not directly come into contact with the second surface 152. More specifically, the sentence that "the plurality of protrusions 149 contact on the second surface 152" means that "in a state where the adhesive is not provided, the second surface 152 directly comes into contact with the plurality of protrusions 149, but does not directly come into contact with the bottom surface 148".

In the present embodiment, the first hole 156 of the fixing plate 150 overlaps the protrusion 149 provided on the first convex portion 147A in a plan view when viewed in the direction perpendicular to the first surface 151. The second hole 157 overlaps the protrusion 149 provided on the second convex portion 147B in a plan view when viewed in the direction perpendicular to the first surface 151. The protrusion 149 overlapping the first hole 156 in a plan view when viewed in the direction perpendicular to the first surface 151 may be referred to as a "first protrusion". The protrusion 149 overlapping the second hole 157 in the plan view when viewed in the direction perpendicular to the first surface 151 may be referred to as a "second protrusion".

In the present embodiment, the first hole 156 and the second hole 157 are arranged in a fourth direction D4 which is perpendicular to the Z direction and intersects the X direction, the Y direction, and the third direction D3. The opening shape of the first hole 156 is circular. The opening shape of the second hole 157 is an oval shape elongated in the fourth direction D4. The oval shape is a shape in which semicircles are coupled to both ends of a rectangle or square, that is, a shape like a track in an athletic field, and includes a shape generated when a circle is trimmed with two parallel lines which are equal in distance from the center point of the circle.

Figure 10:
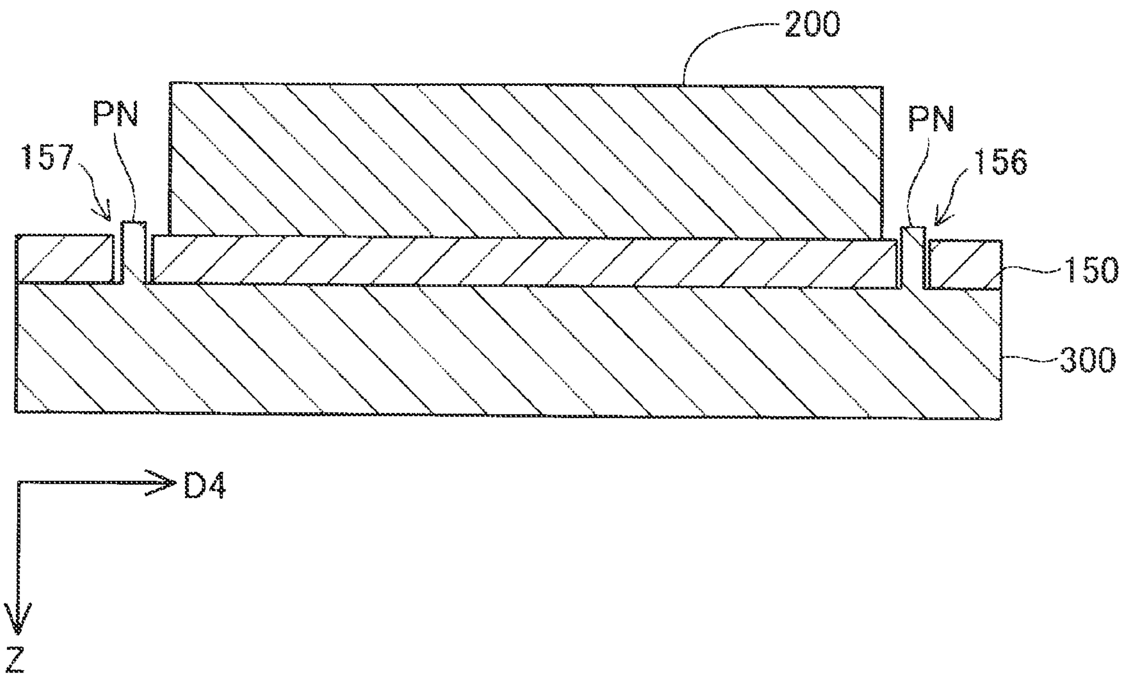
FIG. 10 is diagram illustrating a form in which the liquid ejecting head is assembled.

FIG. 10 is diagram illustrating a form in which the liquid ejecting head 100 is assembled. The first hole 156 and the second hole 157 are used as positioning holes through which positioning pins are inserted when the liquid ejecting head 100 is assembled. In the present embodiment, as illustrated in FIG. 10, positioning pins PN of a jig 300 used for fixing each of the head chips 200 to the fixing plate 150 are inserted through the first hole 156 and the second hole 157. In a state where the fixing plate 150 is positioned at the correct position with respect to the jig 300 by the positioning pins PN, the plurality of head chips 200 are aligned on the fixing plate 150. Positioning pins used for fixing the holder 140 to the fixing plate 150 may be inserted through the first hole 156 and the second hole 157.

Figure 11:
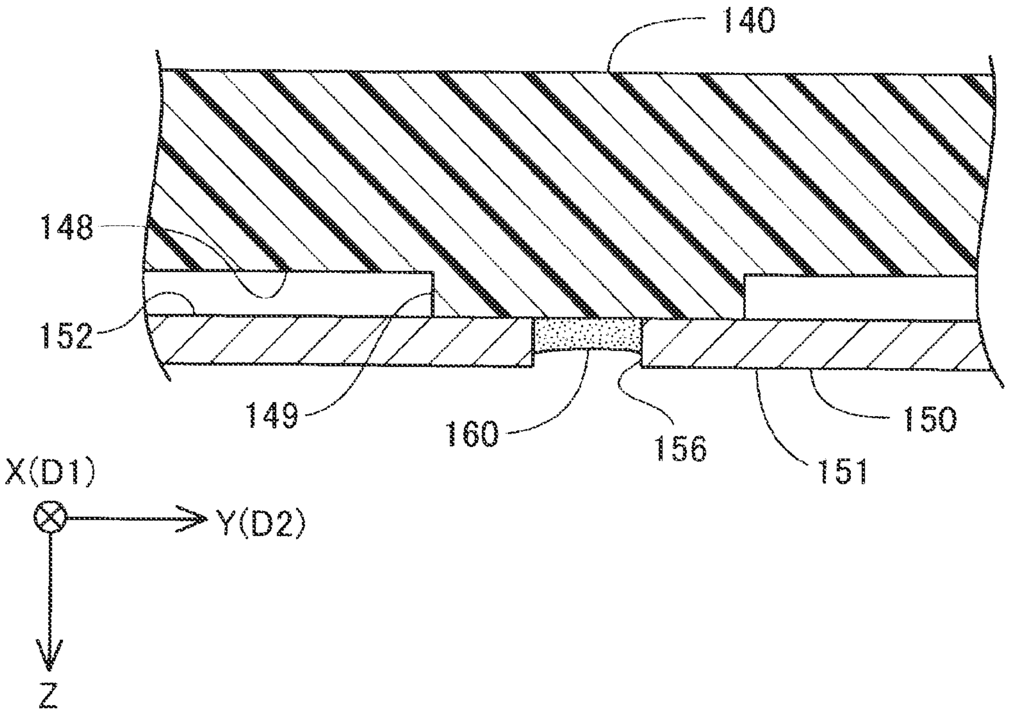
FIG. 11 is a cross-sectional view illustrating a filler disposed in a first hole in the first embodiment.

FIG. 11 is a cross-sectional view illustrating a filler 160 disposed in the first hole 156. FIG. 11 illustrates a cross-sectional view taken along line XI-XI in FIG. 9. The first hole 156 and the second hole 157 are blocked by the filler 160. In the present embodiment, the filler 160 is an epoxy-based adhesive. The filler 160 is not limited to the epoxy-based adhesive, and may be, for example, a silicone-based adhesive. The viscosity of the adhesive used as the filler 160 is preferably low. The first hole 156 and the second hole 157 are used as positioning holes and then blocked by the filler 160. At this time, the filler 160 is disposed in a recess shape in the first hole 156 and the second hole 157 so as not to bulge from the first surface 151 of the fixing plate 150. As described above, a space between the peripheral edge portions of the opening portions 155A to 155F in the fixing plate 150 and the nozzle plates 210 of the head chips 200 is sealed with an epoxy-based adhesive, a silicone-based adhesive, or the like. When a recess is provided on the first surface 151 of the fixing plate 150 instead of the first hole 156 and the second hole 157 penetrating the fixing plate 150, and such a recess is used as the positioning hole, the inside of the recess may not be filled with the filler. However, in the present embodiment, the plate thickness of the fixing plate 150 is equal to or less than 100 micrometers even though the plate thickness is increased due to a manufacturing error. Thus, it is difficult to provide a recess on the fixing plate 150 instead of the first hole 156 and the second hole 157.

Figure 12:
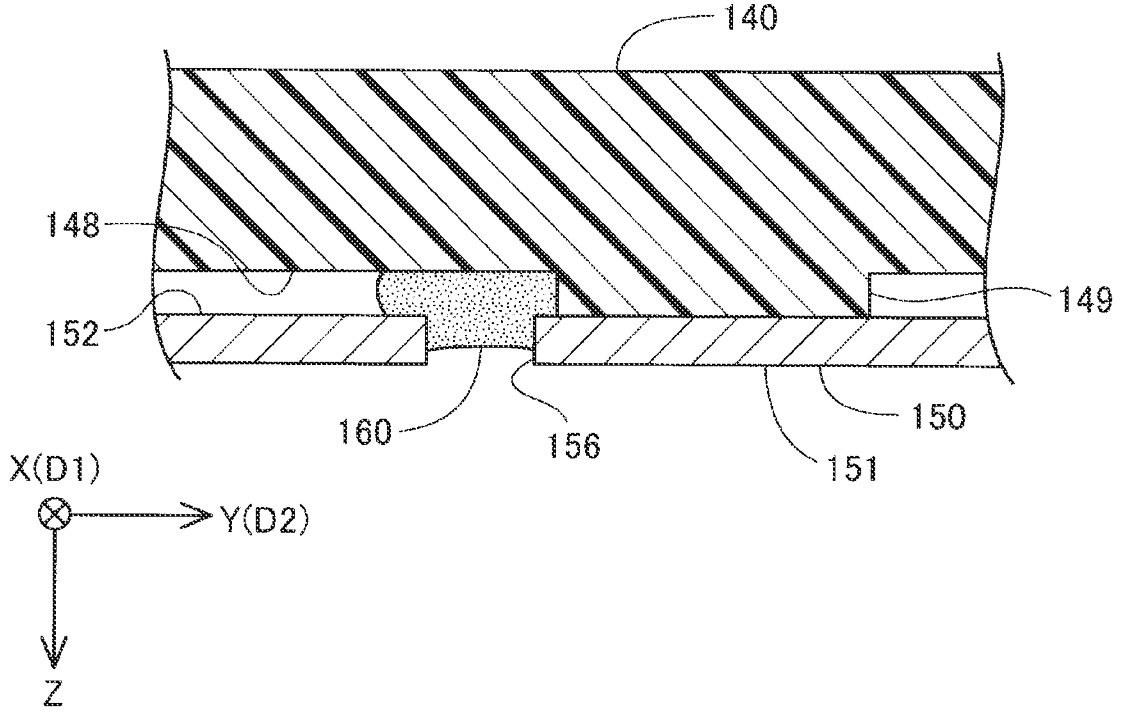
FIG. 12 is a cross-sectional view illustrating a filler disposed in a first hole in a comparative example.

FIG. 12 is a cross-sectional view illustrating a filler 160 disposed in a first hole 156 in a comparative example. In a case where the first hole 156 of the fixing plate 150 does not overlap the protrusion 149 of the holder 140 in a plan view when viewed in the direction perpendicular to the first surface 151, when the first hole 156 is blocked by the filler 160, the filler 160 flows in a gap between the bottom surface 148 of the outer wall portion 145 of the holder 140 and the second surface 152 of the fixing plate 150. Thus, the amount of the filler 160 used to block the first hole 156 may increase, and the first hole 156 may not be blocked because a gap is formed between the peripheral edge portion of the first hole 156 and the filler 160. This is similarly applied to a case where the second hole 157 of the fixing plate 150 does not overlap the protrusion 149 of the holder 140 in a plan view when viewed in the direction perpendicular to the first surface 151. The gap between the second surface 152 of the fixing plate 150 and the bottom surface 148 of the holder 140 communicates with the atmosphere, as illustrated in FIG. 6, through a gap between the holder 140 and the head chip 200, a through-hole provided in the holder 140 to be inserted through the flexible wiring substrate 246 of the head chip 200, the slit hole 136 provided in the circuit substrate 130 to be inserted through the flexible wiring substrate 246, a gap between the circuit substrate 130 and the cover member 120, and the cable hole 126 provided in the cover member 120. Thus, when the first hole 156 and the second hole 157 are not blocked by the filler 160, a space formed between the cap 53 and the first surface 151 of the fixing plate 150 in capping communicates with the atmosphere through the first hole 156 and the second hole 157. Therefore, while the capping is performed, the liquid component of the ink may be evaporated and the nozzle N may be dried out. Further, in suction cleaning, an air flows into the space formed between the cap 53 and the first surface 151 of the fixing plate 150 through the first hole 156 and the second hole 157 even though the suction pump 62 is driven. Thus, sufficient generation of the negative pressure in the above space is not possible, and a suction cleaning problem in which foreign substances or air bubbles are not discharged from the nozzles N together with the ink may occur. Even though the gap between the second surface 152 of the fixing plate 150 and the bottom surface 148 of the holder 140 is small, the nozzle may be dried out or the suction cleaning problem may occur, as described above.

According to the liquid ejecting apparatus 10 in the present embodiment described above, the first hole 156 and the second hole 157 provided in the fixing plate 150 are disposed inside the contacting region Rc on which the cap 53 contacts, in a plan view when viewed in the direction perpendicular to the first surface 151 of the fixing plate 150. In addition, the first hole 156 and the second hole 157 are blocked by the filler 160. Therefore, in capping, it is possible to secure the sealing property in the space formed between the cap 53 and the fixing plate 150, and thus to suppress an occurrence of a situation in which the liquid component of the ink is evaporated, and the nozzle N is dried out. Further, in the present embodiment, the first hole 156 and the second hole 157 are disposed inside the contacting region Rc. Thus, it is possible to reduce the size of the liquid ejecting head 100 in comparison to a case where at least one of the first hole 156 and the second hole 157 is disposed outside the contacting region Rc.

In the present embodiment, the first hole 156 and the second hole 157 are disposed between the opening portion 155C and the opening portion 155D, which are two opening portions 155 adjacent to each other in the X direction. Therefore, it is possible to reduce the size of the liquid ejecting head 100 in the X direction in comparison to a case where at least one of the first hole 156 and the second hole 157 is not provided between two opening portions 155 adjacent to each other, but is disposed, for example, on the −X direction side of the opening portion 155A.

In the present embodiment, the first hole 156 and the second hole 157 are disposed, in the Y direction, between a first virtual line LN1 and a second virtual line LN2. The first virtual line LN1 connects the end portion of the opening portion 155C on the +Y direction side with the end portion of the opening portion 155D on the +Y direction side. The second virtual line LN2 connects the end portion of the opening portion 155C on the −Y direction side with the end portion of the opening portion 155D on the −Y direction side. Therefore, it is possible to provide the contacting region Rc at a position close to each of the opening portions 155 in the Y direction, and thus to reduce the size of the liquid ejecting head 100 in the Y direction.

In the present embodiment, the first hole 156 and the second hole 157 are provided at positions overlapping the protrusions 149 of the holder 140 in a plan view when viewed in the direction perpendicular to the first surface 151. Thus, it is possible to suppress an occurrence of a situation in which the filler 160 flows into the space between the second surface 152 of the fixing plate 150 and the bottom surface 148 of the holder 140 when the first hole 156 and the second hole 157 are blocked by the filler 160. Therefore, in comparison to a form in which the first hole 156 and the second hole 157 are provided at positions that do not overlap the protrusions 149, it is possible to more reliably block the first hole 156 and the second hole 157 and to suppress the increase in the amount of the filler 160 used to block the first hole 156 and the second hole 157. When the bottom surface 148 of the holder 140 and the fixing plate 150 are adhered to each other instead of the protrusion 149 of the holder 140, it is difficult to secure the flatness of the bottom surface so as not to separate the bottom surface 148 of the holder 140 and the fixing plate 150 from each other. In the present embodiment, the protrusion 149 protruding from the bottom surface 148 of the holder 140 is adhered to the fixing plate 150. Thus, it is possible to facilitate adhesion between the holder 140 and the fixing plate 150 and to fix the holder 140 and the fixing plate 150 to each other with high dimensional accuracy.

In the present embodiment, the protrusion 149 of the holder 140 adhered to the peripheral edge portion of the first hole 156 protrudes from the first convex portion 147A provided on the −Y direction side of the first straight line portion 146A. Therefore, in the region A which is surrounded by the first straight line portion 146A and each of the head chips 200 and is formed when each of the head chips 200 is disposed so that the longitudinal direction of each of the head chips 200 is set to the third direction D3, it is possible to adhere the first hole 156 and the protrusion 149 to each other. Thus, it is possible to reduce the waste of the space and to reduce the size of the liquid ejecting head 100. The protrusion 149 of the holder 140 adhered to the peripheral edge portion of the second hole 157 protrudes from the second convex portion 147B provided on the +Y direction side of the second straight line portion 146B. Therefore, in the region B which is surrounded by the second straight line portion 146B and each of the head chips 200 and is formed when each of the head chips 200 is disposed so that the longitudinal direction of each of the head chips 200 is set to the third direction D3, it is possible to adhere the second hole 157 and the protrusion 149 to each other. Thus, it is possible to reduce the waste of the space and to reduce the size of the liquid ejecting head 100.

In the present embodiment, the opening shape of the first hole 156 is circular, and the opening shape of the second hole 157 is an oval shape elongated in the fourth direction D4. Therefore, it is possible to suppress an occurrence of a situation in which a manufacturing error occurs in the fixing plate 150 in the fourth direction D4, and insertion of the positioning pins PN of the jig 300 into the first hole 156 and the second hole 157 is not possible. In particular, in the present embodiment, the first hole 156 and the second hole 157 are disposed at different positions in the X direction. Thus, it is possible to increase the distance between the first hole 156 and the second hole 157 in comparison to a form in which the first hole 156 and the second hole 157 are disposed at the same positions in the X direction. Therefore, it is possible to easily secure the positioning accuracy of the fixing plate 150.

In the present embodiment, the liquid ejecting apparatus 10 includes the discharge path 61 communicating with the inside of the cap 53 and the suction pump 62 for generating the negative pressure in the cap 53 through the discharge path 61. Therefore, in capping, it is possible to discharge foreign substances or air bubbles from the nozzles N together with the ink by generating the negative pressure in the space between the cap 53 and the fixing plate 150 with the suction pump 62.

In the present embodiment, the first hole 156 is disposed on the +Y direction side of the nozzle N provided farthest on the +Y direction side among the plurality of nozzles N provided in the liquid ejecting head 100. The second hole 157 is disposed on the −Y direction side of the nozzle N provided farthest on the −Y direction side among the plurality of nozzles N provided in the liquid ejecting head 100. Therefore, when the ink dried and solidified in the first hole 156 and the second hole 157 is scraped out by the wiping member 71 in wiping, it is possible to suppress the damage of the nozzle N by moving the solidified ink together with the wiping member 71.

B. Second Embodiment

Figure 13:
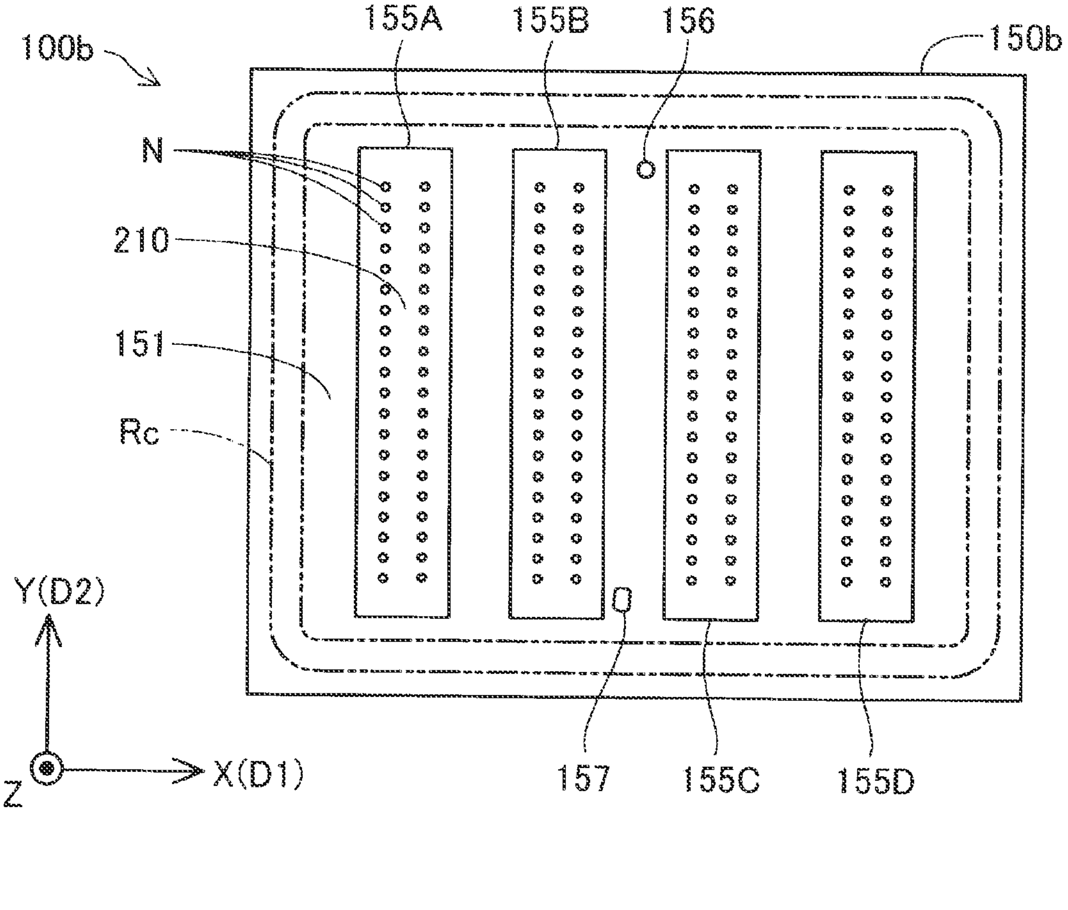
FIG. 13 is a bottom view illustrating a configuration of a fixing plate according to a second embodiment.

FIG. 13 is a bottom view illustrating a configuration of a fixing plate 150*b* according to a second embodiment. In a liquid ejecting apparatus 10 in the second embodiment, the longitudinal direction of each opening portion 155 in the fixing plate 150*b* is different from that in the first embodiment. Other components are the same as those in the first embodiment unless otherwise specified.

In the present embodiment, a liquid ejecting head 100*b* includes four head chips 200. The fixing plate 150*b* is provided with four opening portions 155. The opening shape of each of the opening portions 155 is a rectangle having a longitudinal direction along the Y direction. A quadrangular contacting region Rc is provided on a first surface 151 of the fixing plate 150*b*. Each of the opening portions 155, a first hole 156, and a second hole 157 are provided inside the contacting region Rc. Since the first hole 156 and the second hole 157 are provided at different positions in the X direction, it is easy to secure the positioning accuracy of the fixing plate 150*b*.

According to the liquid ejecting apparatus 10 in the present embodiment described above, similar to the first embodiment, it is possible to secure the sealing property of a space formed between a cap 53 and the fixing plate 150*b* in capping while suppressing the increase in size of the liquid ejecting head 100*b*.

C. Other Embodiments

C1. In the liquid ejecting apparatus 10 in the above-described embodiments, the first hole 156 and the second hole 157 provided in the fixing plates 150 and 150*b* are disposed between two adjacent opening portion 155. On the other hand, the first hole 156 provided in the fixing plates 150 and 150*b* may not be disposed between the two adjacent opening portions 155. The second hole 157 may not be disposed between the two adjacent opening portions 155. For example, in the fixing plate 150 illustrated in FIG. 8, the second hole 157 may be disposed on the −X direction side of the opening portion 155A.

C2. In the liquid ejecting apparatus 10 in the above-described embodiments, the second hole 157 provided in the fixing plates 150 and 150*b* is disposed between the opening portion 155 disposed closest to the first hole 156 among the opening portions 155 disposed on the −X direction side of the first hole 156, and the opening portion 155 disposed closest to the first hole 156 among the opening portions 155 disposed on the +X direction side of the first hole 156. On the other hand, the second hole 157 provided in the fixing plates 150 and 150*b* may not be disposed between the opening portion 155 disposed closest to the first hole 156 among the opening portions 155 disposed on the −X direction side of the first hole 156, and the opening portion 155 disposed closest to the first hole 156 among the opening portions 155 disposed on the +X direction side of the first hole 156. For example, in the fixing plate 150 illustrated in FIG. 8, the first hole 156 may be disposed between the opening portion 155C and the opening portion 155D, and the second hole 157 may be disposed between the opening portion 155B and the opening portion 155C. When three or more opening portions 155 are arranged in the X direction, for example, in the case of the first embodiment, one of the first hole 156 and the second hole 157 may be disposed between the opening portion 155A disposed farthest in the −X direction among the opening portions 155 arranged in the X direction and the opening portion 155B which is adjacent to the opening portion 155A and is disposed on the +X direction side of the opening portion 155A. The other of the first hole 156 and the second hole 157 may be disposed between the opening portion 155F disposed farthest on the +X direction among the opening portions 155 arranged in the X direction and the opening portion 155E which is adjacent to the opening portion 155F and is disposed on the −X direction side of the opening portion 155F. According to such a configuration, it is possible to increase the distance between the first hole 156 and the second hole 157 and to improve the positioning accuracy.

C3. In the liquid ejecting apparatus 10 in the above-described embodiments, the second hole 157 provided in the fixing plates 150 and 150*b* is disposed at a position different from the position of the first hole 156 in the X direction. On the other hand, the second hole 157 provided in the fixing plates 150 and 150*b* may be disposed at the same position as the first hole 156 in the X direction.

C4. In the liquid ejecting apparatus 10 in the above-described embodiments, the first hole 156 provided in the fixing plates 150 and 150*b* is disposed on the −Y direction side of the first virtual line LN1. The second hole 157 is disposed on the +Y direction side of the second virtual line LN2. On the other hand, the first hole 156 provided in the fixing plates 150 and 150*b* may be disposed on the first virtual line LN1 or on the +Y direction side of the first virtual line LN1. The second hole 157 may be disposed on the second virtual line LN2 or on the −Y direction side of the second virtual line LN2.

C5. In the liquid ejecting apparatus 10 in the above-described embodiments, the first hole 156 and the second hole 157 provided in the fixing plates 150 and 150*b* are disposed to overlap the protrusions 149 of the holder 140 in a plan view when viewed in the direction perpendicular to the first surface 151. On the other hand, the first hole 156 may not overlap the protrusion 149 of the holder 140 in a plan view when viewed in the direction perpendicular to the first surface 151, and the second hole 157 may not overlap the protrusion 149 of the holder 140 in a plan view when viewed in the direction perpendicular to the first surface 151.

C6. In the liquid ejecting apparatus 10 of each of the above-described embodiments, the opening shape of the second hole 157 provided in the fixing plates 150 and 150*b* is an oval shape elongated in the fourth direction D4. On the other hand, the opening shape of the second hole 157 provided in the fixing plates 150 and 150*b* may be an oval shape that is long in a direction different from the fourth direction D4. For example, the opening shape of the second hole 157 may be an oval shape that is elongated in the third direction D3. In this case, the first hole 156 and the second hole 157 may be arranged in the third direction D3.

C7. The liquid ejecting apparatus 10 in the above-described embodiments includes the suction mechanism 60. On the other hand, the liquid ejecting apparatus 10 may not include the suction mechanism 60.

C8. The liquid ejecting apparatus 10 in the above-described embodiments includes the wiping mechanism 70. On the other hand, the liquid ejecting apparatus 10 may not include the wiping mechanism 70.

C9. The liquid ejecting apparatus 10 in the above-described embodiment includes the transport mechanism 40 that transports a medium M. On the other hand, in the liquid ejecting apparatus 10, the transport mechanism 40 may move the head unit 30 in the Y direction to relatively move a medium M and the head unit 30 without transporting the medium M.

C10. The liquid ejecting apparatus 10 in the above-described embodiment is configured as a line printer. On the other hand, the liquid ejecting apparatus 10 may be configured as a serial printer. In this case, the liquid ejecting apparatus 10 may include a carriage that holds the liquid ejecting head 100 and reciprocates in the X direction perpendicular to the +Y direction being the transport direction of the medium M.

Figure 14:
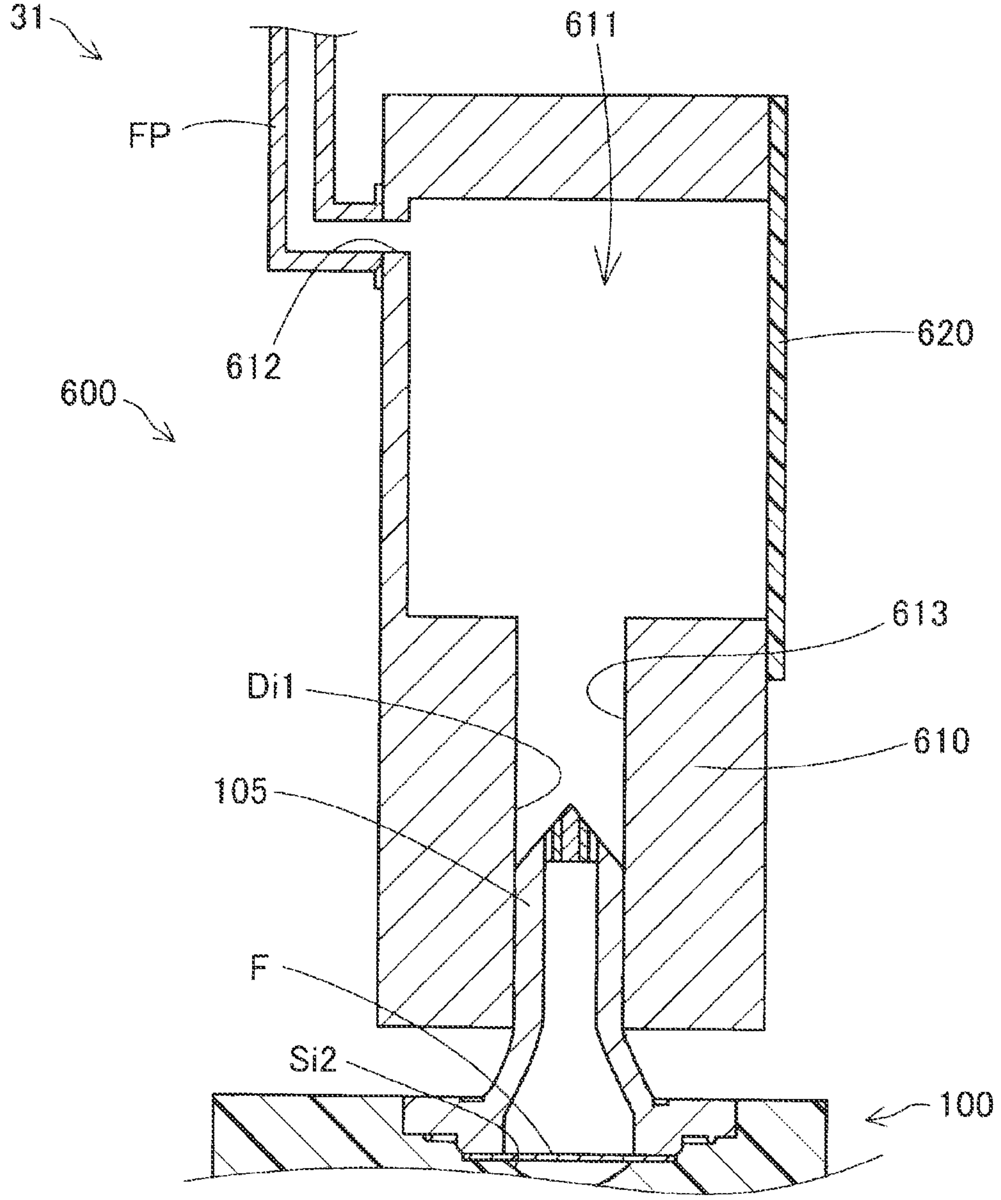
FIG. 14 is a first cross-sectional view illustrating a configuration of a first liquid outflow port in the other embodiment.

C11. FIG. 14 is a first cross-sectional view illustrating the configuration of the first liquid outflow port Di1 of the head unit 30 in another embodiment. In the liquid ejecting apparatus 10 in the above-described embodiment, a pressure adjusting portion 600 illustrated in FIG. 14 may be provided in the distribution flowpath member 31 of the head unit 30 instead of the pressure adjusting valve 500 illustrated in FIG. 5. The pressure adjusting portion 600 includes a housing 610 and a flexible film member 620. A damper chamber 611, an inflow path 612, and an outflow path 613 are provided in the housing 610. The damper chamber 611 is formed by sealing an opening portion of a recess provided in the housing 610 with the film member 620. The damper chamber 611 communicates with the individual flow path FP through the inflow path 612, and communicates with the first liquid outflow port Di1 through the outflow path 613. The supply needle 105 provided in the liquid ejecting head 100 is inserted through the first liquid outflow port Di1. The inner diameter of the first liquid outflow port Di1 is substantially equal to the outer diameter of the supply needle 105. The ink flowing into the damper chamber 611 from the inflow path 612 is supplied to the liquid ejecting head 100 through the outflow path 613. Since a portion of the inner wall surface of the damper chamber 611 is configured by the flexible film member 620, it is possible to suppress the pressure fluctuation of the ink supplied to the liquid ejecting head 100 by bending the film member 620.

Figure 15:
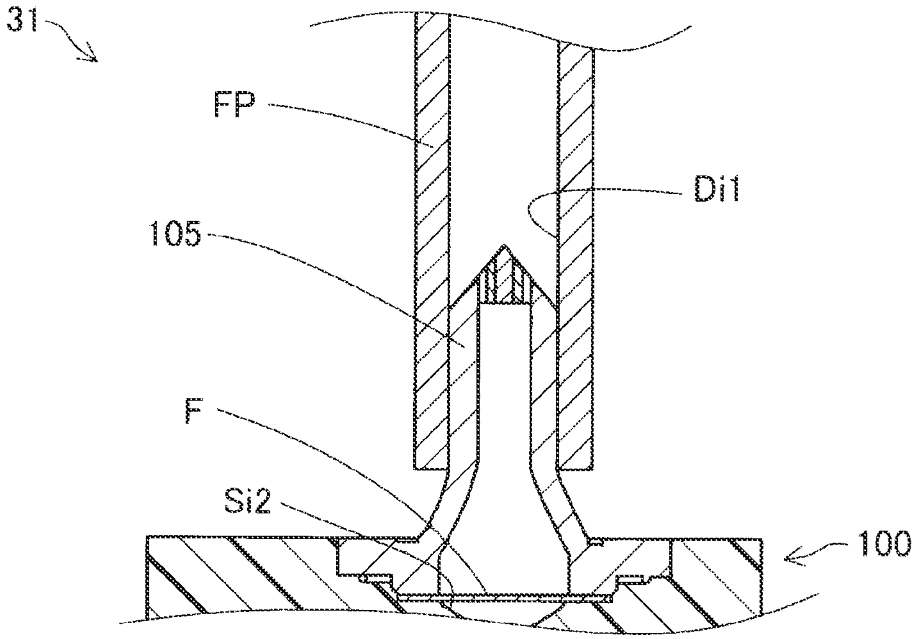
FIG. 15 is a second cross-sectional view illustrating the configuration of the first liquid outflow port in the other embodiment.

C12. FIG. 15 is a second cross-sectional view illustrating the configuration of the first liquid outflow port Di1 of the head unit 30 in another embodiment. In the liquid ejecting apparatus 10 in the above-described embodiment, the pressure adjusting valve 500 illustrated in FIG. 5 may not be provided. In this case, as illustrated in FIG. 15, the supply needle 105 provided in the liquid ejecting head 100 is inserted through the first liquid outflow port Di1 provided at the end portion of the individual flow path FP. The inner diameter of the first liquid outflow port Di1 is substantially equal to the outer diameter of the supply needle 105.

C13. In the above-described embodiment, the +X direction and the +Y direction are directions parallel to the horizontal plane, and the +Z direction is the direction of gravity. However, the present disclosure is not limited thereto. For example, the +Z direction being the direction in which the liquid is ejected from the nozzle N may be a direction different from the direction of gravity, and the +X direction and the +Y direction may be directions that are not parallel to the horizontal plane.

C14. The suction mechanism 60 of the liquid ejecting apparatus 10 in the above-described embodiments may include an on-off valve for opening and closing the discharge path 61 in the middle of the discharge path 61. According to such a configuration, it is possible to more reduce the evaporation of the ink from the nozzle N by closing the on-off valve during the capping.

D. Other Embodiments

The present disclosure is not limited to the above-described embodiment, and can be realized in various forms without departing from the spirit thereof. For example, the present disclosure can also be realized in the following forms. The technical features in embodiments described below correspond to the technical features in the above embodiment can be appropriately replaced and combined in order to solve some or all of the problems of the present disclosure, or to achieve some or all of the effects of the present disclosure. Further, the technical features can be appropriately deleted so long as the technical features are not described as being essential in the present specification.

1. According to an aspect of the present disclosure, a liquid ejecting apparatus is provided. The liquid ejecting apparatus includes a liquid ejecting head and a cap configured to contact on an annular contacting region provided in a fixing plate. The liquid ejecting head includes a plurality of head chips, each including a nozzle plate provided with a plurality of nozzles, and the fixing plate provided with a plurality of opening portions for exposing the respective nozzle plates of the plurality of head chips. A first hole and a second hole different from the plurality of opening portions are provided in the fixing plate. The fixing plate includes a first surface provided with the contacting region and a second surface to which the plurality of head chips are fixed, the second surface being a surface on an opposite side of the first surface. The plurality of opening portions are disposed inside the contacting region in a plan view when viewed in a direction perpendicular to the first surface. Each of the first hole and the second hole is disposed inside the contacting region in the plan view and is closed by a filler.

According to the liquid ejecting apparatus in this aspect, since the first hole and the second hole of the fixing plate are disposed inside the contacting region, it is possible to suppress the increase in size of the liquid ejecting head. Further, since the first hole and the second hole are blocked by the filler, when the cap is caused to contact on the contacting region of the fixing plate, it is possible to secure the sealing property of the space surrounded by the fixing plate and the cap.

2. In the liquid ejecting apparatus in the above aspect, the first hole may be disposed between the two opening portions adjacent to each other among the plurality of opening portions. The second hole may be disposed between the two opening portions adjacent to each other among the plurality of opening portions.

According to the liquid ejecting apparatus in this aspect, it is possible to reduce the contacting region in comparison to a form in which the first hole and the second hole are not disposed between the opening portions adjacent to each other. Thus, it is possible to reduce the size of the liquid ejecting head in comparison to a form in which the first hole and the second hole are not disposed between the opening portions adjacent to each other.

3. In the liquid ejecting apparatus in the above aspect, the plurality of opening portions may include a first opening portion and a second opening portion adjacent to each other. The first hole and the second hole may be disposed between the first opening portion and the second opening portion.

According to the liquid ejecting apparatus in this aspect, it is possible to reduce the contacting region in comparison to a form in which the first hole and the second hole are not disposed between the opening portions adjacent to each other. Thus, it is possible to reduce the size of the liquid ejecting head in comparison to a form in which the first hole and the second hole are not disposed between the opening portions adjacent to each other.

4. In the liquid ejecting apparatus of the above embodiment, the plurality of opening portions may be arranged in a first direction along the first surface. Each of the plurality of opening portions is long in a second direction along the first surface, which is perpendicular to the first direction. The first hole and the second hole may be disposed at different positions in the first direction.

According to the liquid ejecting apparatus in this aspect, it is possible to increase the distance between the first hole and the second hole. Thus, it is possible to easily secure the positioning accuracy when the first hole and the second hole are used as the positioning holes.

5. In the liquid ejecting apparatus in the above aspect, the plurality of opening portions may be arranged in a first direction along the first surface. The first hole and the second hole may be disposed between a virtual line connecting end portions of the plurality of opening portions on a second direction side and a virtual line connecting end portions of the plurality of opening portions on an opposite side of the second direction side, the second direction being a direction along the first surface and perpendicular to the first direction.

According to the liquid ejecting apparatus in this aspect, it is possible to decrease the distance between the contacting region and each of the opening portions in the second direction. Thus, it is possible to reduce the size of the liquid ejecting head in the second direction.

6. In the liquid ejecting apparatus in the above aspect, the liquid ejecting head may include a holder fixed to the plurality of head chips. The holder may include an outer wall portion fixed to the second surface of the fixing plate. A tip portion of the outer wall portion facing the second surface may include a bottom surface disposed at a distance from the second surface and a plurality of protrusions that protrude from the bottom surface to the fixing plate and contact on the second surface. The plurality of protrusions may include a first protrusion and a second protrusion. The first hole may overlap the first protrusion in the plan view, and the second hole may overlap the second protrusion in the plan view.

According to the liquid ejecting apparatus in this aspect, even though the dimensions of the bottom surface of the holder vary, it is possible to fix the protrusion of the holder and the second surface of the fixing plate to each other with high dimensional accuracy. Further, in a plan view when viewed in the direction perpendicular to the first surface, the first hole overlaps the first protrusion and the second hole overlaps the second protrusion. Thus, it is possible to suppress an occurrence of a situation in which the filler flows from the first hole and the second hole when the first hole and the second hole are blocked by the filler. Accordingly, it is possible to easily block the first hole and the second hole.

7. In the liquid ejecting apparatus in the above aspect, the plurality of head chips may be arranged in a first direction along the first surface. Each of the plurality of head chips may be long in a third direction that intersects both the first direction and a second direction along the first surface, which is perpendicular to the first direction. The plurality of head chips may include a first head chip and a second head chip adjacent to each other. A first opening portion may expose the first head chip, and the second opening portion may expose the second head chip. The outer wall portion may include a first outer wall portion and a second outer wall portion disposed to sandwich the plurality of head chips in the second direction. The first outer wall portion may include a first straight line portion provided along the first direction and a first convex portion protruding from the first straight line portion in the second direction. The second outer wall portion may include a second straight line portion provided along the first direction and a second convex portion protruding from the first straight line portion in an opposite direction of the second direction. The first convex portion may be provided in a region surrounded by the first straight line portion, a short side of the first head chip close to the first straight line portion, and a long side of the second head chip close to the first head chip, in a plan view. The second convex portion may be provided in a region surrounded by the second straight line portion, a short side of the second head chip close to the second straight line portion, and a long side of the first head chip close to the second head chip, in the plan view. The first protrusion may protrude from a bottom surface of the first convex portion, and the second protrusion may protrude from a bottom surface of the second convex portion.

According to the liquid ejecting apparatus in this aspect, even though the dimensions of the bottom surface of the holder vary, it is possible to fix the protrusion of the holder and the second surface of the fixing plate to each other with high dimensional accuracy. Further, in a plan view when viewed in the direction perpendicular to the first surface, the first hole overlaps the first protrusion and the second hole overlaps the second protrusion. Thus, it is possible to suppress an occurrence of a situation in which the filler flows from the first hole and the second hole when the first hole and the second hole are blocked by the filler. Accordingly, it is possible to easily block the first hole and the second hole. Further, it is possible to make an arrangement in which the first hole overlaps the first protrusion, and the second hole overlaps the second protrusion in a region formed when the head chip is disposed so that the longitudinal direction of the head chip is set to the third direction. Thus, it is possible to suppress the increase in size of the liquid ejecting head.

8. In the liquid ejecting apparatus in the above aspect, the first hole and the second hole may be arranged in a fourth direction along the first surface. One of a shape of the first hole and a shape of the second hole may be circular, and the other of the shape of the first hole and the shape of the second hole may be an oval shape elongated in the fourth direction.

According to the liquid ejecting apparatus in this aspect, in a case where, when the liquid ejecting head is assembled, the fixing plate is positioned in a manner that the positioning pins are inserted through the first hole and the second hole, it is possible to easily insert the positioning pins through the first hole and the second hole even though the position of the second hole is shifted from the position of the first hole in the fourth direction due to the manufacturing error of the fixing plate.

9. The liquid ejecting apparatus in the above aspect may further include a discharge path that communicates with an inside of the cap, and a suction mechanism that generates negative pressure in the cap through the discharge path.

According to the liquid ejecting apparatus in this aspect, the first hole and the second hole are blocked by the filler. Thus, it is possible to suppress an occurrence of a situation in which, when the cap is caused to contact on the fixing plate, the space formed by the cap and the fixing plate communicates with the atmosphere through the first hole and the second hole. Therefore, it is possible to effectively generate the negative pressure in the space formed by the cap and the fixing plate, with the suction mechanism.

10. The liquid ejecting apparatus in the above aspect may further include a wiping member that wipes the nozzle plate and the fixing plate by coming into contact with the nozzle plate and the fixing plate while relatively moving to the liquid ejecting head in a predetermined wiping direction.

According to the liquid ejecting apparatus in this aspect, in a form of including the wiping member that wipes the nozzle plate and the fixing plate, it is possible to secure the sealing property of the space surrounded by the fixing plate and the cap.

11. In the liquid ejecting apparatus in the above aspect, the first hole and the second hole may be disposed between the contacting region and a range in which the plurality of nozzles are provided, in a direction perpendicular to the wiping direction.

According to the liquid ejecting apparatus in this aspect, when foreign substances accumulated in the first hole or the second hole are scraped out by the wiping member, it is possible to suppress an occurrence of a situation in which the foreign substances moving together with the wiping member are brought into contact with the nozzles. Thus, it is possible to suppress the damage of the nozzles due to the foreign substances scraped from the first hole or the second hole.

12. The liquid ejecting apparatus in the above aspect may further include a transport mechanism that transports a medium.

According to the liquid ejecting apparatus in this aspect, in a form in which a medium is transported by the transport mechanism, it is possible to secure the sealing property of the space surrounded by the fixing plate and the cap.

The present disclosure can also be realized in various forms other than the liquid ejecting apparatus. For example, the present disclosure can be realized in the form of a liquid ejecting head, a head unit, or the like.

What is claimed is:

1. A liquid ejecting apparatus comprising:
- a liquid ejecting head including
- head chips, each including a nozzle plate provided with nozzles, and
- a fixing plate provided with opening portions for exposing the respective nozzle plates of the head chips; and
- a cap configured to contact on an annular contacting region provided in the fixing plate, wherein
- a first hole and a second hole different from the opening portions are provided in the fixing plate,
- the fixing plate includes
- a first surface provided with the annular contacting region, and
- a second surface to which the head chips are fixed, and that is opposite from the first surface,
- the opening portions are disposed inside the annular contacting region in a plan view when viewed in a direction perpendicular to the first surface, and
- each of the first hole and the second hole is disposed inside the annular contacting region in the plan view and is blocked by a filler.

2. The liquid ejecting apparatus according to claim 1, wherein
- the first hole is disposed between two opening portions adjacent to each other among the opening portions, and
- the second hole is disposed between two opening portions adjacent to each other among the opening portions.

3. The liquid ejecting apparatus according to claim 2, wherein
- the opening portions are arranged in a first direction along the first surface,
- each of the opening portions is long in a second direction that is along the first surface and that is perpendicular to the first direction, and the first hole and the second hole are disposed at different positions with respect to the first direction.

4. The liquid ejecting apparatus according to claim 2, wherein the opening portions are arranged in a first direction along the first surface, and the first hole and the second hole are disposed between a virtual line connecting end portions of the opening portions on a second direction side and a virtual line connecting end portions of the opening portions on an opposite side of the second direction side, the second direction being a direction along the first surface and perpendicular to the first direction.

5. The liquid ejecting apparatus according to claim 1, wherein the opening portions have a first opening portion and a second opening portion adjacent to each other, and the first hole and the second hole are disposed between the first opening portion and the second opening portion.

6. The liquid ejecting apparatus according to claim 5, wherein the first opening portion and the second opening portion are arranged in a first direction along the first surface, the first opening portion is long in a second direction that is along the first surface and that is perpendicular to the first direction, and the first hole and the second hole are disposed at different positions with respect to the first direction.

7. The liquid ejecting apparatus according to claim 5, wherein the first opening portion and the second opening portion are arranged in a first direction along the first surface, and the first hole and the second hole are disposed between a virtual line connecting end portions of the first and second opening portions on a second direction side and a virtual line connecting end portions of the first and second opening portions on an opposite side of the second direction side, the second direction being a direction along the first surface and perpendicular to the first direction.

8. The liquid ejecting apparatus according to claim 5, wherein the liquid ejecting head includes a holder fixed to the head chips, the holder includes an outer wall portion fixed to the second surface of the fixing plate, a tip portion of the outer wall portion facing the second surface includes a bottom surface disposed at a distance from the second surface and protrusions that protrude from the bottom surface to the fixing plate and that contact on the second surface, the protrusions include a first protrusion and a second protrusion, the first hole overlaps the first protrusion in the plan view, and the second hole overlaps the second protrusion in the plan view.

9. The liquid ejecting apparatus according to claim 8, wherein the head chips are arranged in a first direction along the first surface, each of the head chips is long in a third direction that intersects both the first direction and a second direction, the second direction being along the first surface and perpendicular to the first direction, the head chips includes a first head chip and a second head chip adjacent to each other, a first opening portion exposes the first head chip, a second opening portion exposes the second head chip, the outer wall portion includes a first outer wall portion and a second outer wall portion disposed to sandwich the head chips in the second direction, the first outer wall portion includes a first straight line portion provided along the first direction and a first convex portion protruding from the first straight line portion in the second direction, the second outer wall portion includes a second straight line portion provided along the first direction and a second convex portion protruding from the first straight line portion in an opposite direction of the second direction, the first convex portion is provided in a region surrounded by the first straight line portion, a short side of the first head chip close to the first straight line portion, and a long side of the second head chip close to the first head chip, in a plan view, the second convex portion is provided in a region surrounded by the second straight line portion, a short side of the second head chip close to the second straight line portion, and a long side of the first head chip close to the second head chip, in the plan view, the first protrusion protrudes from a bottom surface of the first convex portion, and the second protrusion protrudes from a bottom surface of the second convex portion.

10. The liquid ejecting apparatus according to claim 1, wherein the liquid ejecting head includes a holder fixed to the head chips, the holder includes an outer wall portion fixed to the second surface of the fixing plate, a tip portion of the outer wall portion facing the second surface includes a bottom surface disposed at a distance from the second surface and protrusions that protrude from the bottom surface to the fixing plate and that contact on the second surface, the protrusions include a first protrusion and a second protrusion, the first hole overlaps the first protrusion in the plan view, and the second hole overlaps the second protrusion in the plan view.

11. The liquid ejecting apparatus according to claim 1, wherein the first hole and the second hole are arranged in a fourth direction along the first surface, one of a shape of the first hole and a shape of the second hole is circular, and the other of the shape of the first hole and the shape of the second hole is an oval shape elongated in the fourth direction.

12. The liquid ejecting apparatus according to claim 1, further comprising:

a discharge path that communicates with an inside of the cap; and a suction mechanism that generates negative pressure in the cap through the discharge path.

13. The liquid ejecting apparatus according to claim 1, further comprising:

a wiping member that wipes the nozzle plate and the fixing plate by coming into contact with the nozzle plate and the fixing plate while relatively moving to the liquid ejecting head in a predetermined wiping direction.

14. The liquid ejecting apparatus according to claim 13, wherein the first hole and the second hole are disposed between the annular contacting region and a range in which the nozzles of the nozzle plates are provided, in a direction perpendicular to the wiping direction.

15. The liquid ejecting apparatus according to claim 1, further comprising:

a transport mechanism that transports a medium.

* * * * *